(12) United States Patent
Hinshaw et al.

(10) Patent No.: US 7,698,338 B2
(45) Date of Patent: Apr. 13, 2010

(54) FIELD ORIENTED PIPELINE ARCHITECTURE FOR A PROGRAMMABLE DATA STREAMING PROCESSOR

(75) Inventors: Foster D. Hinshaw, Somerville, MA (US); Raymond A. Andraka, North Kingstown, RI (US); David L. Meyers, Shrewsbury, MA (US); Sharon L. Miller, Boxborough, MA (US); William K. Stewart, Lexington, MA (US)

(73) Assignee: Netezza Corporation, Framingham, MA (US)

( * ) Notice: Subject to any disclaimer, the term of this patent is extended or adjusted under 35 U.S.C. 154(b) by 755 days.

(21) Appl. No.: 10/665,726

(22) Filed: Sep. 18, 2003

(65) Prior Publication Data

US 2004/0139214 A1    Jul. 15, 2004

Related U.S. Application Data

(60) Provisional application No. 60/412,057, filed on Sep. 19, 2002, provisional application No. 60/411,686, filed on Sep. 18, 2002.

(51) Int. Cl.
*G06F 17/30* (2006.01)
(52) U.S. Cl. ...................................... 707/754
(58) Field of Classification Search ................. 707/6–7, 707/100–101; 712/10, 37
See application file for complete search history.

(56) References Cited

U.S. PATENT DOCUMENTS

| | | | |
|---|---|---|---|
| 4,068,301 A | 1/1978 | Ishino et al. | |
| 4,594,655 A | 6/1986 | Hao et al. | |
| 4,811,214 A | 3/1989 | Nosenchuck et al. | |
| 5,687,363 A | 11/1997 | Oulid-Aissa et al. | |
| 5,701,460 A | 12/1997 | Kaplan et al. | |
| 5,721,909 A | 2/1998 | Oulid-Aissa et al. | |

(Continued)

FOREIGN PATENT DOCUMENTS

WO    WO 98/55946    12/1998

OTHER PUBLICATIONS

Acharya, A., et al., "Active Disks: Programming Model, Algorithms and Evaluation," ACM *Sigplan Notices, Association for Computing Machinery*, (33) 11:81-91 (Nov. 1998).

(Continued)

*Primary Examiner*—Khanh B Pham
(74) *Attorney, Agent, or Firm*—Hamilton, Brook, Smith & Reynolds, P.C.

(57) ABSTRACT

A field oriented pipeline processor for a data engine that can be programmed to recognize record and field structures of data received from a source such as a mass storage device. The processor has an interface for receiving field-delineated data from a field parser. The field parser parses non-field delineated data from a streaming data source into field delineated data under instruction from an external processing unit. The pipeline processor receives a field delineated data stream and employs logical arithmetic methods to compare fields with one another, or with values otherwise supplied by general purpose processors to precisely determine which records are worth transferring to memory of the more general purpose distributed processors. The architecture of the data engine allows for the use of substitution tables, temporary registers, and a data string register to assist in the efficiency and accuracy of the data engine processing.

20 Claims, 6 Drawing Sheets

U.S. PATENT DOCUMENTS

| | | | |
|---|---|---|---|
| 5,781,897 A | 7/1998 | Chen et al. | |
| 5,822,527 A | 10/1998 | Post | |
| 5,835,755 A | 11/1998 | Stellwagen, Jr. | |
| 5,860,087 A | 1/1999 | Maeda et al. | |
| 5,884,299 A | 3/1999 | Ramesh et al. | |
| 5,937,401 A | 8/1999 | Hillegas | |
| 5,937,415 A | 8/1999 | Sheffield et al. | |
| 5,983,270 A | 11/1999 | Abraham et al. | |
| 5,999,937 A | 12/1999 | Ellard | |
| 6,078,955 A | 6/2000 | Konno et al. | |
| 6,138,118 A | 10/2000 | Koppstein et al. | |
| 6,151,602 A * | 11/2000 | Hejlsberg et al. | 707/10 |
| 6,295,533 B2 | 9/2001 | Cohen | |
| 6,332,163 B1 | 12/2001 | Bowman-Amuah | |
| 6,339,772 B1 | 1/2002 | Klein et al. | |
| 6,345,206 B1 | 2/2002 | Adamy et al. | |
| 6,411,974 B1 | 6/2002 | Graham et al. | |
| 6,415,373 B1 | 7/2002 | Peters et al. | |
| 6,434,649 B1 | 8/2002 | Baker et al. | |
| 6,477,540 B1 | 11/2002 | Singh et al. | |
| 6,493,701 B2 | 12/2002 | Ponnekanti | |
| 6,493,761 B1 * | 12/2002 | Baker et al. | 709/230 |
| 6,507,834 B1 | 1/2003 | Kabra et al. | |
| 6,529,896 B1 | 3/2003 | Leung et al. | |
| 6,542,508 B1 | 4/2003 | Lin | |
| 6,542,886 B1 | 4/2003 | Chaudhuri et al. | |
| 6,594,651 B2 | 7/2003 | Kabra et al. | |
| 6,601,064 B1 | 7/2003 | Nag et al. | |
| 6,721,749 B1 * | 4/2004 | Najm et al. | 707/100 |
| 6,732,084 B1 | 5/2004 | Kabra et al. | |
| 6,789,116 B1 * | 9/2004 | Sarkissian et al. | 709/224 |
| 6,996,117 B2 * | 2/2006 | Lee et al. | 370/429 |
| 2001/0036322 A1 | 11/2001 | Bloomfield et al. | |
| 2002/0038313 A1 | 3/2002 | Klein et al. | |
| 2002/0052749 A1 * | 5/2002 | Bauer | 704/277 |
| 2002/0095400 A1 | 7/2002 | Johnson et al. | |
| 2002/0116358 A1 | 8/2002 | Heath | |
| 2002/0128823 A1 | 9/2002 | Kovacevic | |
| 2002/0161748 A1 | 10/2002 | Hamel et al. | |
| 2003/0009531 A1 | 1/2003 | Richmann et al. | |
| 2003/0126056 A1 | 7/2003 | Hausman et al. | |
| 2003/0212668 A1 | 11/2003 | Hinshaw et al. | |
| 2004/0117037 A1 | 6/2004 | Hinshaw et al. | |
| 2004/0133565 A1 | 7/2004 | Hinshaw et al. | |
| 2004/0148420 A1 | 7/2004 | Hinshaw et al. | |
| 2005/0021813 A1 | 1/2005 | Kovacevic et al. | |
| 2005/0154705 A1 | 7/2005 | Zwiegincew et al. | |

OTHER PUBLICATIONS

Keeton, K., et al., "A Case for Intelligent Disks (IDISKs)," *SIGMOD Record*, (*27*)3:41-52, (Sep. 1998).

Graefe, G., "Query Evaluation Techniques for Large Databases," *ACM Computing Surveys*, (*25*)2:73-170, (Jun. 1993).

Dewitt, D., et al., "Parallel Database Systems: The Future of High Performance Database Systems," *Communications of the Association for Computing Machinery* (*3*):6:85-98, (Jun. 1992).

Uysal, M., et al., "Evaluation of Active Disks for Decision Support Databases," *IEEE*, pp. 337-348, (1999).

Guyetant, S., et al., "Architecture Parallèle Reconfigurable Pour La Génoique," RENPAR'14, ASF, Sympa Conference, pp. 1-4, (Apr. 2002).

Riedel, E., et al., "Active Disks for Large-Scale Data Processing," *Computer, IEEE*, (*34*)6:68-74, (2001).

Hsu, W. W., et al., "Projecting the Performance of Decision Support Workloads on Systems with Smart Storage (SmartSTOR)," *IEEE*, pp. 417-425, (2000).

Dimakopoulos, V. V., et al., "The SMart Autonomous Storage (SMAS) System," *IEEE*, vol. 1, pp. 303-306, (2001).

Memik, G., et al., "Design and Evaluation of a Smart Disk Cluster for DSS Commercial Workloads," *J. of Parallel and Distributed Computing*, (*61*) 1633-1664, (2001).

Wickremesinghe, R., et al., "Distributed Computing with Load-Managed Active Storage," Proceedings of the 11th IEEE International Symposium on High Performance Distributed Computing HPDC-11 2002) (HPDC'02), pp. 13-23, (Jul. 2002).

Leilich, H., et al., "A Search Processor for Data Base Management Systems," Proceedings of the Fourth International Conference on Very Large Bases, IEEE, pp. 280-287, (Sep. 1978).

Notice of Allowance and Fees Due, 3 pages, combined with Notice of Allowability, 6 pages, with attachments, dated Aug. 7, 2009, U.S. Appl. No. 10/667,128.

Acharya, et al., "Tuning the Performance of I/O-Intensive Parallel Applications," *ACM*, pp. 15-27 (May 1996).

Andrade, et al., "Efficient Execution of Multiple Query Workloads in Data Analysis Applications," *AMC*, pp. 1-11 (Nov. 2001).

Moon, et al., "Evaluation of Predicated Array Data-Flow analysis for Automatic Parallelization," *AMC*, pp. 84-95 (1999).

* cited by examiner

FIELD ORIENTED PIPELINE ARCHITECTURE FOR A PROGRAMMABLE DATA STREAMING PROCESSOR

RELATED APPLICATIONS

This application claims the benefit of U.S. Provisional Application No. 60/412,057 entitled "Asymmetric Streaming Record Processing Computer System," filed on Sep. 19, 2002, and U.S. Provisional Application No. 60/411,686 entitled "Intelligent Storage Device Controller," filed on Sep. 18, 2002. The entire teachings of these provisional applications are hereby incorporated by reference.

This application is also related to pending U.S. patent application Ser. No. 10/667,203, filed Sep. 18, 2003; pending U.S. patent application Ser. No. 10/666,729, filed Sep. 18, 2003; pending U.S. patent application Ser. No. 10/668,113, filed Sep. 18, 2003; and pending U.S. patent application Ser. No. 10/667,128, filed Sep. 18, 2003.

The entire teachings of each of these co-pending patent applications is also hereby incorporated by reference. This application and the above applications are also all assigned to Netezza Corporation.

BACKGROUND OF THE INVENTION

This invention relates to distributed data processing systems that use multiple processing unit groups, and in particular to a programmable streaming data processor that performs initial primitive functions before data is further handled by a more general purpose job processor.

Among the applications that continue to make the greatest demands on data processing systems are those that require management of massive amounts of information. Indeed, the ability to efficiently access data stored in related files, most commonly known as Data Base Management Systems (DBMS), continues to drive development of complex but efficient system architectures. Present day DBMS systems are used to manage many different forms of data, including not only field oriented records but almost any form of data including text, images, sound, video clips and similar less structured data. DBMSs are, therefore, now expected to provide an efficient, consistent, and secure method to store and retrieve data of varying types.

It is now common in high performance systems to distribute the processing load among multiple processors, and thus provide for processing of data in parallel. These systems take a data query such as may be presented in a Structured Query Language (SQL), and develop an optimized plan for parallel execution. One processor may be used as a dispatcher to analyze the query, set up communication links between the various parallel processors, instruct the processors as to how to carry out the query, and insure that results are sent back to the server that initiated the query. Therefore, in such a distributed environment, data may typically be stored on an array of storage devices. One or more computers attached to the disk drives are responsible for reading data and analyzing it, by executing portions of the query.

Even though queries may be optimized for parallel processing in this manner, the problem with such a system is that data must be still retrieved from the disk and placed in a processor's memory prior to analyzing it. Only then can the processors operate on the data. Thus, although this approach off loads specific jobs from the responsibility of a single processor, valuable time is still spent in the process of data retrieval and storage among the distributed processors. Even if only a portion of the data retrieved is extraneous, the time spent fetching it is wasted.

The speed at which data analysis can be performed is limited to the speed at which the entire set of data can be transferred into one of the distributed processor's memories and, processed by its Central Processing Unit (CPU). Disks are inexpensive; thus, many disks can be used to store extremely large databases. Since all of them may be read in parallel, the effective data transfer rate of such a system is almost arbitrarily fast. Usually the bandwidth of the communication network connecting the distributed processors is less than the aggregate data transfer rate of the disks. Furthermore, the time required by the CPUs to analyze the data retrieved from the disks is typically far longer than the time required to retrieve the data. Bottlenecks occur, thus, either in the communication network or in the CPU processing, but not on the disks themselves.

Certain development efforts known as active disk drives and/or intelligent drives, have attempted to push processing bottlenecks from the network down to the disk elements themselves. Such efforts sought to place a processor directly on the disks, such as located on a hardware interface card connected to a disk drive device. This assembly of custom hardware card and disk then acts as a high powered disk drive. By placing methods for intelligently filtering and retrieving data on the local disk, this approach reduces the load on a host computer's Central Processing Unit. However, this approach requires custom disk assemblies so that industry standard disk drive interfaces must be modified. This increases the overall cost and complexity of installation.

SUMMARY OF THE INVENTION

Brief Description of a Preferred Embodiment

The present invention is a circuit that processes data from a streaming data source, such as a disk drive, prior to its being forwarded to a central processing unit (CPU) of a more general purpose processor. The circuit performs certain preliminary processing in order to reduce the computational load on the local CPU.

In a specific system architecture in which the present invention may be used, one or more host processors are responsible for accepting queries that are requests for data. The requests may originate from applications that run on the host themselves or on processing nodes that are connected to the host via networks of various types. Queries are typically provided in a Structured Query Language (SQL) or other standard query formats. The hosts develop a plan for executing a query, typically dividing the plan into a set of jobs to be executed by a number of distributive processing units, herein called Job Processing Units (JPUs).

Each JPU has a special purpose programmable processor, referred to herein as a Programmable Streaming Data Processor (PSDP), as well as a more general purpose Central Processing Unit (CPU). Each JPU also has a memory, one or more mass storage device interfaces, and one or more network interfaces.

The PSDP is a processor that is distinct from the more general purpose CPU in each JPU. It is also distinct from the CPU of the "host" in the first group. The PSDP serves as an interface between the CPU of a JPU and one or more mass storage devices. The PSDP can be incorporated into the SQL execution plan as developed by the host, thereby relieving the general CPU in the JPU from a number of preliminary data processing functions The PSDP can be implemented as a Field Programmable Gate Array (FPGA), as in the preferred embodiment, or as an Application-Specific Integrated Circuit (ASIC), a fully-custom Application Specific Standard Product (ASSP), or even as discrete logic on a printed-circuit board. It can also be included in an integrated processor (i.e., an FPGA that embeds a CPU and peripheral interface logic) on a single chip or in a single package, or it can be included with the circuitry of the mass storage device.

More particularly, the PSDP is programmable by the host and/or CPU to interpret data in a specific format as it is read from the associated disk(s). This enables PSDP to perform portions of jobs directly, as it is read off the disk, prior to such data ever being forwarded to the CPU.

In an embodiment specifically adapted for the processing of record-oriented data, the PSDP can parse non-field-delineated, streaming data from the mass storage device of a database into block header fields, record header fields, and record data fields and then filter the record header and data fields so that only certain fields from certain records are actually output by the PSDP to be placed in the JPU's memory. In other words, the PSDP can be programmed to understand the record and field structure of the data which the analysis software running on the CPU of the JPU wishes to analyze. Therefore, the PSDP can further process data in the specific format of the database application. In this process, the PSDP can discard fields and entire records that the CPU of the JPU would have to otherwise analyze, or at least mark them to be ignored.

In a preferred embodiment, before commencing to read and analyze a particular database, software running on the CPU of the JPU programs the PSDP with the particulars of the database format. The PSDP can then locate block header field, record header field, and record data field boundaries. Then, the PSDP can further employ appropriate logical or arithmetic methods to compare fields with one another, with other values supplied by the CPU of the JPU, or select and/or process fields. It should be understood that the PSDP could also be programmed by the host or some other source.

In a preferred embodiment, there may be one or more reasons for which the PSDP may discard a field or mark it unworthy of further attention. The first such reason is an analysis of the contents of data fields. As one example, the PSDP can be programmed to check a purchase order database against a range of numbers that correspond to the year and date of a purchase. The query may have requested that only records that correspond to transactions occurring during the month of July in the year 1999 be marked for further processing. Other records that do not pass this initial filtering operation are to be discarded and/or marked such that they are ignored in further processing by the CPU. In the example database, a record may contain data fields for the month and date of a transaction, another data field indicating an identifier for the store in which the transaction occurred, other data fields for stock keeping unit (SKU) values indicating the items purchased, the name of the customer, and the customer's address. As block of data stream off the disk into the PSDP, they can be separated by the PSDP into fields, analyzed, and marked for further processing (or discarded) accordingly.

A second reason for which the PSDP can be used to discard or mark a record is in support of database record creation and deletion in a multi-user environment. Specifically, by their nature, databases are not static. That is, they are often updated and it is common for databases to be accessible by many users at the same time. Thus, a situation often occurs where some users are analyzing data in a database while others are updating it. To allow all users concurrent access to the database, records can be tagged with transaction numbers that indicate when or by whom each record was created or marked obsolete. Users querying such a database may not wish to see a record created by other users whose activity began subsequently, or whose activity began previously but is not yet complete. If so, such a user will probably still want to see records marked obsolete by such a user. Or, such a user may wish to only see results of transactions entered by certain users, or only the results of transactions not entered by certain users. To facilitate this kind of record filtering, the headers of records can contain transaction identifiers (TIDS) that the PSDP can then be programmed to compare with a current user's identifier. In this manner the PSDP can therefore determine whether particular records should be "visible" to the current user. Again, the PSDP performs this operation in the process of transferring data to memory, thus relieving the CPU of the JPU from an otherwise time consuming task.

To implement record tagging, the PSDP may have processing logic known as a Data Engine that is capable of examining fields of a record to determine whether a record will or will not be passed to the CPU of the JPU as an output tuple. An output tuple is comprised of the fields of the source record from the disk that are to be selected for further processing by the CPU and PSDP generated fields. For example, a record retrieved from disk consists of a record header, typically containing more than one header field, and at least one data field, and typically, many data fields for each record. The collection of fields selected for return to the CPU as a result of processing a record is referred to a tuple. Possible tuple fields include various record header fields, the PSDP generated record address, unmodified record data fields, a hash field, and tuple status and length information. Boolean results and/or scratch pad words may also form parts of tuples. Most often a tuple will be shorter than the record that was used to generate it, but it may be longer, depending upon the program that is provided to the PSDP.

As data streams out of the filter, an output tuple is formed in a First In, First Out (FIFO) memory, in a way that permits aborting the tuple if the filter logic determines that the particular tuple should not be passed on to the CPU. Specifically, the memory FIFO has two write pointers, an "active" write pointer and a "visible" write pointer. The visible pointer maintains a position indicating a boundary of the last accepted tuple. Meanwhile, the active write pointer moves along the memory FIFO from the boundary, as words of the next possible tuple become available. As the PSDP logic determines that a tuple is not to be used, such as a result of the filter or TID processing described above, the memory FIFO's active write pointer resets by moving back to the visible write pointer location. This has the effect of ignoring the intervening fields of the unwanted tuple and allowing them to be overwritten. If the PSDP logic makes this determination while the active pointer is still pointed to a field within the unwanted tuple, the active pointer will simply reset to the visible pointer location until the last field within that unwanted tuple has been overwritten.

If, on the other hand, the PSDP logic determines that a tuple is to be used, the visible pointer moves to the active pointer position, having the effect of keeping all intervening fields of the tuple that should be kept.

The length of the FIFOs is chosen depending upon the expected maximum field length in a preferred embodiment. For example, the FIFOs may each be 16 bytes long. However, in certain databases, very long records may have many fields or very large fields, many of which are to be returned if the record meets the criteria. For example, very large character objects or variable length character objects (varchars) may also be encountered. Practical implementations of the PSDP may not be able to store or buffer the largest possible site of returnable fields, especially in databases that have variable length fields.

In such a case, the PSDP, being a hardware device, can begin sending the tuple it is forming in the memory FIFO to the memory of the JPU before it has actually made a decision about whether or not the tuple should actually be sent to the CPU. After a record has been completely processed by the PSDP and even after all selected fields have been transferred through the FIFO. The PSDP can still tag the transferred data with one or more bits, typically at the end of the tuple, that indicates the record and/or field is to be ignored. This approach can still save the CPU a great deal of work.

So in practice, the PSDP preferably appends a length and status indication to record fragments that it does transfer to the CPU, so that the CPU can not only find boundaries between tuples (record fragments), but also so that the CPU can distinguish among multiple reasons for discarding a record.

Discussion of Advantages

A number of advantages result from using a PSDP with record tagging.

Like the custom controller approach, any need to first read records into a memory location prior to performing operations on them is avoided. Thus, when only a fraction of the available data is relevant to a query, the PSDP allows initial database filtering operations to be performed "on the fly" in a streaming fashion, as records stream out of a mass storage device.

In a preferred embodiment, the PSDP can be programmed to perform operations such as Boolean comparisons of record field values against either literal values, other record field values, or values held in registers of the processing element, and reject records that fail these Boolean comparisons before they are stored in the JPU's memory. Of the records that pass the filtering conditions, the PSDP element can thus not only filter out the subset of fields that are irrelevant to a particular query, but even filter and/or discard entire records.

Even when a tuple has already been sent to an output buffer, the PSDP can still mark such a record to be ignored in further processing. This is in contrast to most database systems, which may materialize data as blocks of binary information that need to be parsed by differing operations; which use different paradigms for network, storage, and internal operations; and which are unable to stream efficiently because of those different paradigms.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF A PREFERRED EMBODIMENT

A. System Level Architecture

1. First Group Components

Figure 1:
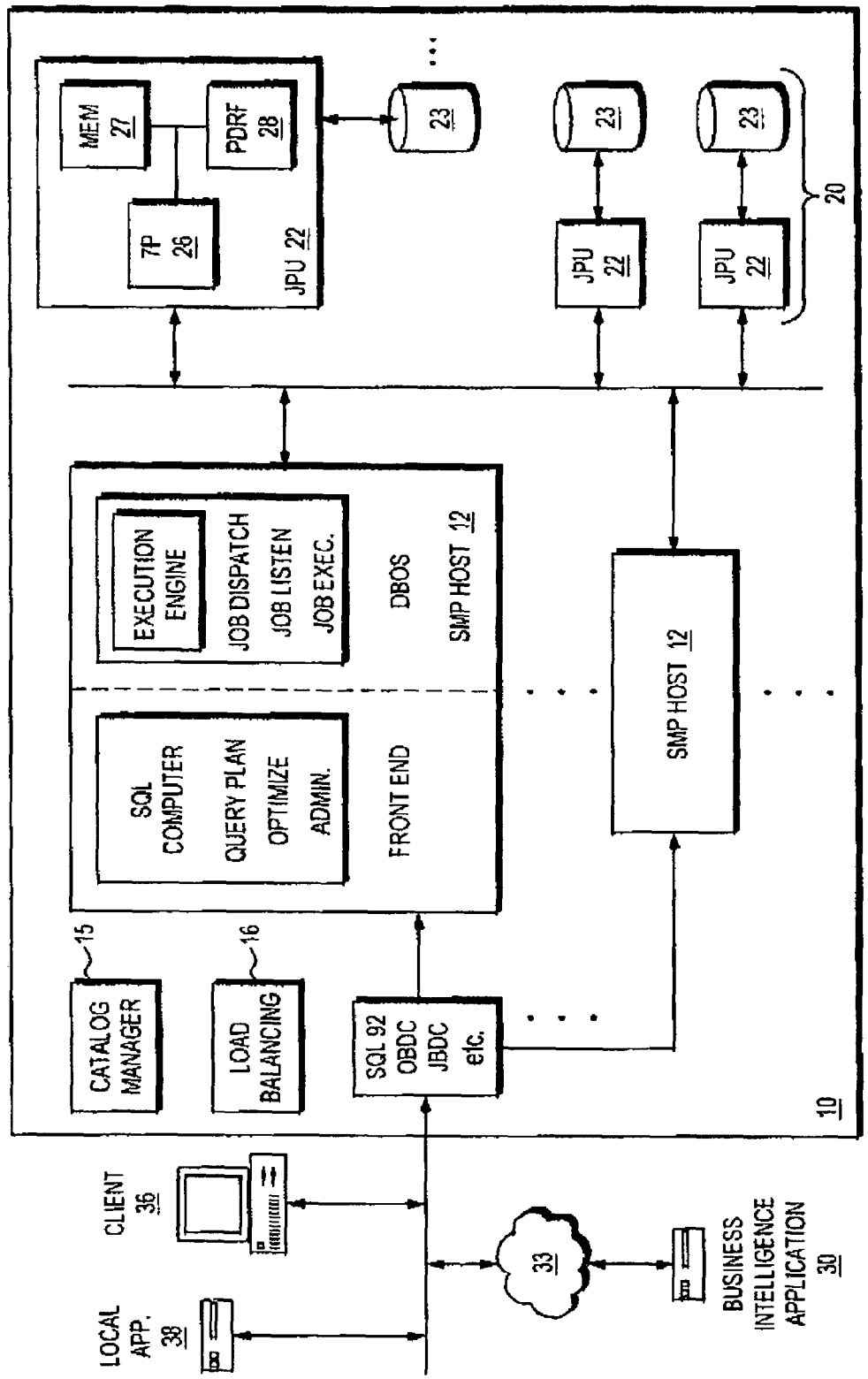
FIG. 1 is a system level block diagram of an asymmetric record processing system according to the present invention.

The present invention is a data processing system having at least two "groups" of processing units, in which the individual components of each group are individual network "nodes" within the system. As more particularly shown in FIG. 1, the first group 10 consists of one or more "host" computers 12, each with its own memory, network interface, and local storage (not shown in FIG. 1). Each host 12 runs its own operating system, and typically, but not necessarily, each host 12 uses the same type of operating system as the other hosts 12. The hosts 12 may be arranged in a Symmetric Multiprocessing (SMP) topology.

The hosts 12 typically accept queries that are requests for data stored on mass storage devices, such as hard disk drives 23. Queries are typically provided in a format such as Structured Query Language (SQL), Open DataBase Connectivity (ODBC), Java DataBase Connectivity (JDBC), or the like. Hosts develop and optimize a query execution plan which typically consists of one or more jobs to be processed by other elements of the system. The requests may originate from any number of business applications that may reside on local processors 38, client computers 36, or separately running remote application software 30 that may access the host 12 through a computer network 33. The hosts 12 accept queries that can retrieve, modify, create and/or delete data stored on disk 23 and the schema for such data. The hosts 12 also accept requests to start, commit, and rollback transactions against the data. The hosts 12 also perform typical administrative functions such as reporting on the status of the system 10, start and shutdown operation, backing up the current state of the data, restoring previous states of the data, replicating the data, and performing maintenance operations.

An execution engine portion of the host 12 develops a plan and then dispatches jobs to CPUs 26, Programmable Streaming Data Processors (PSDPs) 28 and other system components.

Optionally, there is a load balancing function 16 in front of the host 12 processors, which directs individual transactions to a specific host or hosts 12 so as to evenly distribute workload.

A catalog management component 15 contains descriptions of the fields and layout of data. Catalog management 15 also contains information about which users and applications have which permissions to operate in which ways and on which types of records, datasets, and relations. The various hosts 12 interact with catalog management 15 in order to process the requests they receive. In one embodiment, catalog management 15 is embedded within one of the hosts 12, with parts replicated to the other hosts 12 and second group 20 components. As will be understood shortly, the catalog manager provides information to permit the components of the second group 20 to efficiently perform filtering functions.

With the exception of their need to consult catalog management 15, the hosts 12 are generally able to develop plans to respond to requests without having to communicate among themselves. In very rare instances, inter-host 12 communication may occur to resolve a transaction sequencing issue.

2. Second Group Components

Figure 2:
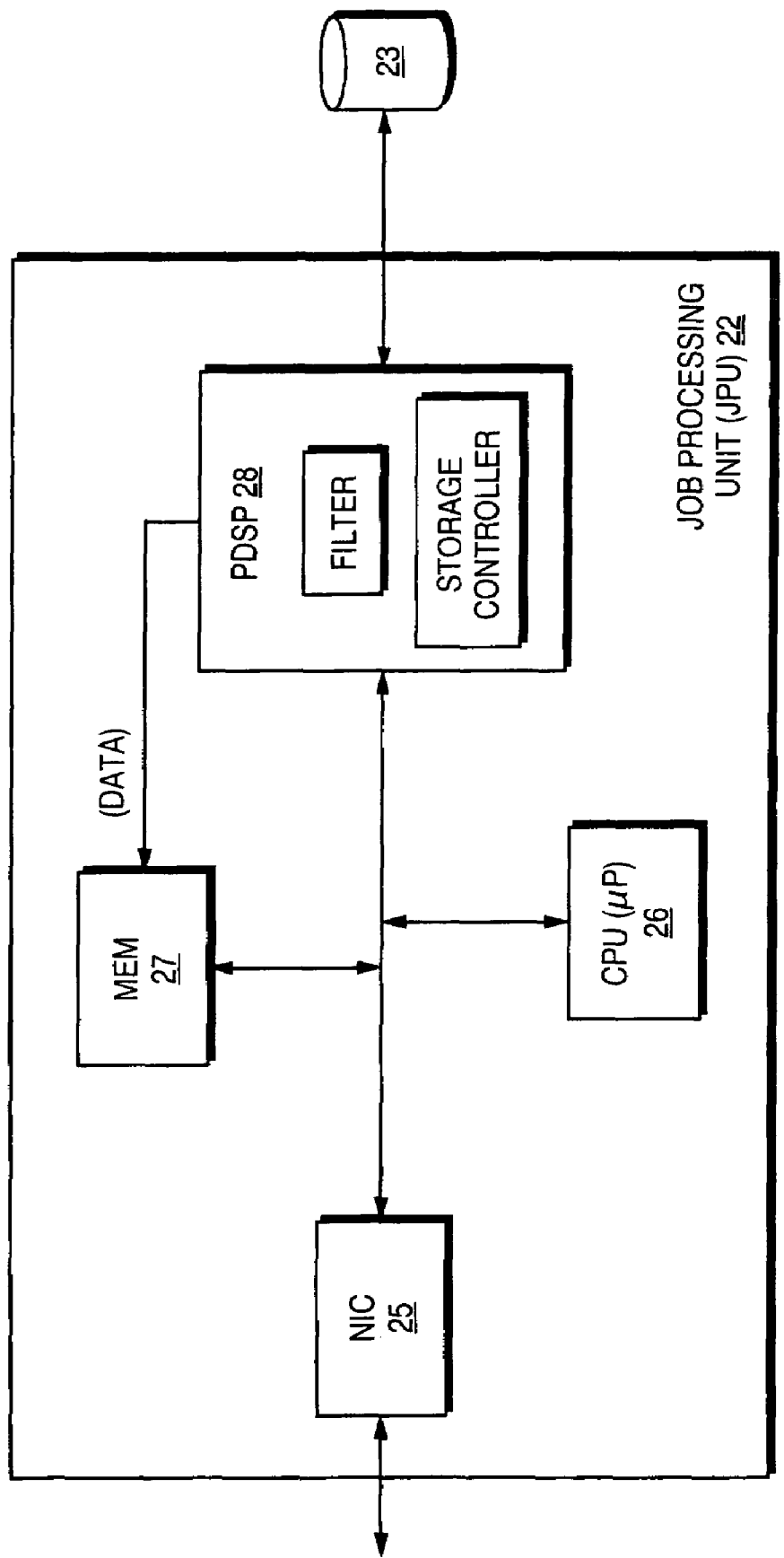
FIG. 2 is a more detailed view of a Job Processing Unit (JPU).

The second group 20 consists of a plurality of Job Processing Units (JPUs) 22. As shown in FIG. 2, each JPU 22 consists of a network interface 25 for receiving requests and delivering replies, a general purpose Central Processing Unit (CPU) 26 such as a microprocessor, a memory 27, and a custom integrated circuit known as a Programmable Streaming Data Processor (PSDP) 28. Each JPU 22 also has one or more mass storage devices, such as a disk 23, attached from which the JPU 22 may read streaming data. In other embodiments, the JPU 22 can receive streaming record data from alternate or additional sources such as other on-board processors or via other network interfaces in place of the disk drives 23. Such streaming data might include stock quotes, satellite data, patient vital signs, and other kinds of "live-feed" information available via a network connection.

The JPU 22 accepts and responds to requests from host computers 12 in the first group 10 to process the streaming non-field-delineated data under its control. The JPU 22 also accepts descriptions of the fields and layout of the data for parsing the streaming data. These requests are typically "jobs" of a larger query, and are expressed as sequences of primitive operations on an input stream. The primitive operations could be interpreted, but in the preferred embodiment, they are packaged as compiled code that is ready for execution. An exemplary job-based query is described in more detail below.

In addition to processing jobs, a JPU 22 also accepts and responds to requests from hosts for other operations such as:
  Start, pre-commit, commit, abort, and recover transactions
  Perform mirroring or other replication operations
  Start, initialize, reinitialize, stop, and retrieve status information
  Create, modify, or delete descriptions of records, indices, views and other metadata Each JPU 22 can also accept and respond to other requests from the hosts 12 such as:
  Perform mirroring or other replication operations
  Redistribute data from one JPU to another
  Send data local to one JPU to another JPU to help process a query job
  Send data to a logging device
  Send data to a replication device
  Acknowledge the successful completion of an operation requested by another node.

The CPUs 26 in the JPUs 22 typically use a multi-tasking schedule-based Operating System (OS) to allow receiving, processing, and reporting the results from multiple jobs in a job queue. The OS should preferably support overlapping job execution. The OS is thus responsible for scheduling and prioritizing requests according to a number of factors that are determined in real time. These may include a job priority as assigned by the user and/or host 12, as well as a job's expected impact on the JPU's 22 local resources including the amount of memory, disk, network, and/or I/O queues needed to complete the job. The JPU 22 can also contain software for performing concurrency control, transaction management, recovery and replication of data for which the JPU is responsible.

JPUs 22 in the second group 20 are not directly visible or accessible to the users of the applications that present queries to the system 10. Instead, the JPUs 22 are an embedded component that maintains significant autonomy and control over their data. A given record (or other data primitive) in the system 10 is thus normally directly accessible to, and processed by only one JPU 22. While JPUs may replicate their records to increase reliability or performance, they do not share responsibility for processing a given record with other JPUs 22 when carrying out a job as part of a query. More details of this autonomous, asynchronous nature of the job dispatch scenario between JPUs 22 and hosts 12 can be found in the co-pending U.S. patent application reference above, entitled "Programmable Data Streaming Architecture Having Autonomous and Asynchronous Job Processing Unit,". Ser. No. 10/666,729.

Figure 3:
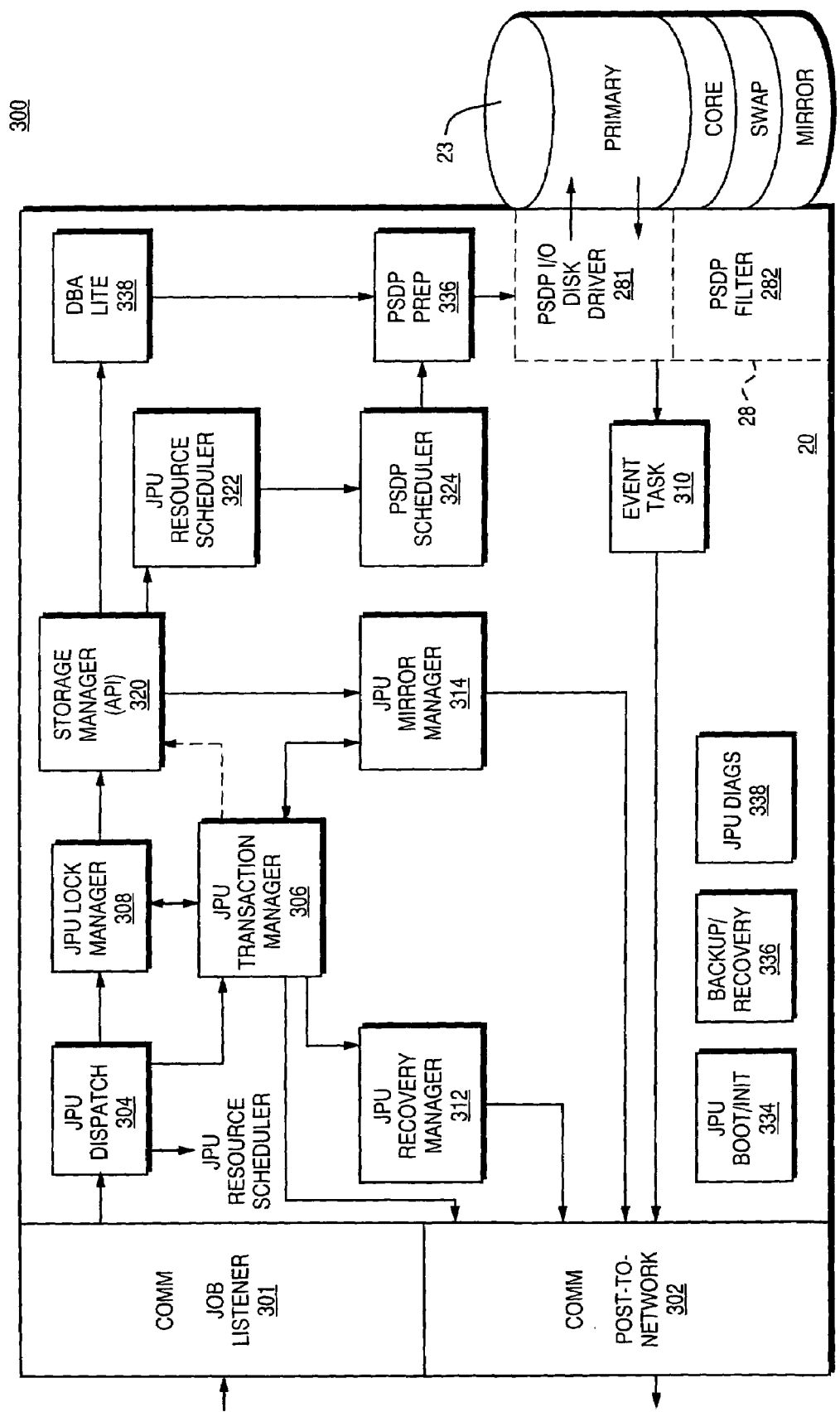
FIG. 3 is a block diagram of the JPU Software Component

The storage manager 320, as shown in FIG. 3, within each JPU 22 provides support for other functions such as error checking, creation and deletion of tables, the use of indices, record insert and delete, mass loading of existing user data among various JPUs, and the like.

Throughout the system, the components and sub-components are designed to optimize performance thru extensive use of streaming operations coupled with tuple set operations. As will be understood shortly, most operations are designed to take tuple sets (records or groups of records) as their input and output streams; these operations try not to materialize data, but instead they stream the output to the next operation. As a consequence many operations can be handled as one continuous data flow, whereas in a conventional system, it would be necessary to handle them in various layers.

For instance, a storage layer can be designed as a tuple set manager where (from the view of other JPU 22 processes) it stores and retrieves tuple sets. From the storage layer onward, data is normally handled in tuple sets, providing a consistent, well organized, and easily accessible format for internal operations. This is in contrast to other systems where the storage layer stores and retrieves undifferentiated blocks of data which are later converted to tuple sets by some other downstream process. Another example of the streaming/tuple set architecture is the network layer, which sends and receives tuple sets instead of blocks of data.

A streaming/tuple set operation can be illustrated by tracking a typical dataflow during a load operation. In this example load case, as data is read into a host 12 over TCP/IP network connection 32. That data is parsed, error-checked, and transformed, and the distribution value calculated, all while the specific byte/field is in processor cache, and saved to the internal network output frame buffers as one step. The result is that the input data is read/transformed in a streaming fashion and converted to network-ready tuple set packets at streaming speed with minimal overhead. As each packet is received, it is sent over the internal network 34 to an appropriate JPU 22 (as determined by the a distribution value in a Query Plan). At the JPU 22, the received data is read, converted into an approved storage format, and placed in memory buffers on a record-by-record basis. As memory buffers are filled, a storage layer in the JPU double-checks that the data corresponds to the indicated table, and that the table "owns" the physical space on the disk 23, and then writes that data to the disk 23. Note that during this process, a given byte of data was "touched" only a few times, and that the data was manipulated in tuple sets thereby optimizing performance and reliability.

A second illustration of a streaming tuple set operation is a join/aggregate operation where three joins and one co-located aggregation are performed on JPUs 22, and the results are returned through the host 12 to the client 36 (e.g., Business Objects).

In this example, for each JPU in the system, the disk 23 is scanned and data read off the disk through the associated PSDP, which parses block data and then filters records of interest and fields of interest within those records, and places the resulting tuples into a tuple set buffer.

The reader should understand that the terms "record" and "tuple" are used herein merely to differentiate between the location of data from the perspective of the PSDP (i.e. the disk output is referred to as "records" whereas the filter output is referred to as "tuples"). This terminology is not meant to be limiting in any way as to the particular data type or data formats that the PSDP can handle.

The PSDP extracts fields from the data, removing extraneous fields and records, which reduces the dataflow into the CPU, in turn reducing the CPU processing load. More information regarding the streaming nature of data transfer in this system can be found in the co-pending U.S. patent application entitled "Asymmetric Streaming Record Data Processor Method and Apparatus," Ser. No. 10/666,729 referred to previously.

B. Detailed Description of PSDP Architecture

As discussed above, the PSDP 28 functions as a disk drive controller and as a coprocessor or hardware accelerator for the JPU 22 to which it is attached. The PSDP 28 allows data to be processed during Direct Memory Access (DMA) disk read operations. There are many different possible operations, including transforming and comparing data with other data or with constants, to determine if a record is wanted or is to be discarded.

PSDP 28 thus performs two major functions: as a disk driver logic interface 281 and data "filter" 282. It is sufficient here to note that the disk driver logic interface 281 accepts standard disk drive interface signaling, such as IDE (Integrated Device Electronics) also known as Advanced Technology Attachment (ATA) or SCSI (Small Computer Systems Interface), adapting it to a particular native "bus" such as a IBM's External Bus Connector (EBC) bus or the like. Alternatively, if there is a communications network, such as Ethernet or Fibrechannel, instead of array of disks 23 to provide access to input data stream(s), the interface 281 becomes a network interface that is suitable to receive and/or transmit data over a communications network. The disk driver logic 281 is usually implemented in an Integrated Circuit (IC) in a computer or communications device, in or part of an IC that contains other logic, such as other interface logic or the CPU 26 itself. The disk driver 281 can even be inside the disk 23 itself, making the disk a special-purpose unit attachable only to JPUs or communications devices for which the interface is specific.

In the preferred embodiment, the PSDP 28 is however an Integrated Circuit (IC) that interfaces a standard disk 23 to a peripheral bus of the CPU 26. All such controllers have the basic function of allowing the CPU 26 in the JPU 22 to read and write the disk 23, typically by setting up long data transfers between contiguous regions on the disk and contiguous regions (either real or virtual) in the JPU's memory 27, a process usually referred to as Direct Memory Access (DMA).

Most importantly, the PSDP 28 also provides programmable hardware directly in the disk read path from the controller. This portion of the PSDP hardware, called the data engine 400, is programmed to understand the structure of the data the analysis software running on the CPU 26 wishes to read and analyze. The PSDP 28 can be programmed to operate on data as it is received from the disk 23, before it is stored into the JPU's memory, and in the process discard data that the CPU 26 would otherwise have to analyze and discard in the absence of the data engine 400. In an embodiment specifically adapted for processing of field-oriented data, data can be parsed by the PSDP 28 into block header, record header, and record data fields of a database, and the record fields can be filtered by the PSDP 28 so that only certain fields from certain records are actually forwarded to be written into the associated JPU's memory 27.

Many other operations beyond simple filtering are possible however. For example, records with certain characteristics can be tagged as they are processed, to indicate that such records are to be ignored in further processing, or to indicate certain attributes of such records, such as if they are to be handled differently in a transaction from other records. Other, non-filter like processes can be implemented such as compression/decompression; encryption/decryption; simple join operations, and the like.

The invention is of particular use in processing field-oriented database records, to extract fields from records, to modify fields and the like. However, it should be understood that the system can also be used to an advantage in processing many different types of data, including other field delineated data such as tables, indices, and views. For example, the system can also be advantageously used to process less structured data, such as, variable length character strings, Binary Large Objects (BLOBS), graphics files, and the like. So although referred to herein as a data engine that processes "records", it should thus be understood that data engine can also perform many other functions on various types of data.

As one example of filtering record-oriented data, the PSDP 28 can be programmed to recognize that a certain set of records in a database has a specified format, for example, a preamble or "header" of determined length and format, perhaps a field including the length of the record, followed by data including some number of fields of a certain type and length (e.g., 4-byte integers), followed by some number of fields of a different type and/or length (e.g., 12-byte character strings), followed by some number of fields of variable length, whose first few bytes specify the length of the field in some agreed-upon manner, and so forth.

The data engine can then execute this program as it reads data from the disk 23, locate record header and data field boundaries, and even employ further appropriate Boolean logic or arithmetic methods to compare fields with one another or with literal values. This allows the data engine to determine precisely which fields of which records are worth transferring to memory. The remaining records are discarded, or tagged in a manner that signals the CPU 26 that a record need not be analyzed. Again, there will be more discussion of how this is done in detail below.

In the preferred embodiment, there are two basic reasons for which the data engine can discard a record (or mark it as unworthy of attention). The first is an analysis of the contents of the fields. Using a previous example, the data engine can, for example, be programmed to analyze records in a store sales database to check a purchase date field against a range of numbers that correspond to dates in the month of July in the year 1999, another field for a number or string uniquely associated with a particular store in North Carolina, and another field for a set of SKU (Stock-Keeping Unit) values belonging to various styles of raincoats. In this fashion, the data engine can mark only those records for further processing. The data engine can further be programmed to know which fields contain the name and address of the customer who made the purchase, and return only these fields from the interesting records. Although other database software could perform these operations, being an embedded hardware device, the data engine can perform them at the same rate as the data is supplied by the disk 23. Far less data ends up in the JPU's memory 27 and, as a result, leaves the CPU 26 free for more complex tasks such as sorting the resulting list of names and addresses by last name or by postal code.

A second example of how the data engine can be used to discard or mark a record, occurs in record creation and deletion in a multi-user environment. Databases are not static, and it is quite common for some users to be analyzing a database while others are updating it. To allow concurrent access, to the database by multiple users, records can be tagged with transaction numbers that indicate when or by whom a record was created or marked obsolete. A user querying a database may not wish to see records created by another user whose activity began subsequently, or whose activity began previously but is not yet complete; if so, he probably will want to see records marked obsolete by such a user. Or the user may wish to see only the results of transactions entered by certain users, or only the results of transactions not entered by certain users. To facilitate this kind of record filtering, record headers can contain creation and deletion transaction identifiers (TIDs) that the data engine can be programmed to compare with the current user's identifier to determine whether records should be "visible" to the current user. Once again, the data engine can avoid transferring useless data to memory or relieve the CPU 26 of a time-consuming analysis task.

In the preferred embodiment there are two basic methods the data engine can use to save the communications network or the CPU 26 from handling useless data. As described above, the data engine can simply discard the memory FIFO/driver 406 data. This is not always practical, however. Imagine a very long record with many fields, or large fields, many of which are to be returned to the CPU 26. Further consider a situation where a record meets the criteria is arranged in such a way that the contents of the last field are relevant to the decision to transfer or discard the selected fields of the record. Practical implementations of the data engine may not be able to store ("buffer") the largest possible set of returnable fields in a very long record, since there will be a limit on local buffer size.

In such a case, the data engine must begin sending the selected fields to the CPU 26 before it can tell whether they actually should be sent. After the record has been completely processed by the data engine, and all the selected fields transferred to the CPU 26, the data engine can, however, tag the transferred data with status bits that says "never mind", thus saving the CPU 26 and the communications network a great deal of work.

In practice, the data engine can append a length indication to every record fragment it does transfer to the CPU 26, so that the CPU 26 can find the boundaries between the tuples the filter unit deposits in memory. This is a natural place for the status bits (or bit, if the CPU 26 need not distinguish among multiple reasons) indicating the transfer of a useless record.

In addition to selecting certain fields from certain records for transfer to the CPU 26, the data engine can create and return additional fields not present in the database, by performing calculations on the contents of the fields that are present. This can further relieve the CPU 26 of work. An example of this is the calculation of a "hash" function on the values of specified fields from a record, some of whose fields are to be transferred to the CPU 26. A hash function is a numerical key assigned to a collection of numeric or non-numeric field values that speeds up the process of searching through a list of records. Other examples of useful information that can be computed by the data engine include minimum or maximum field values from one record to the next, physical record addresses, and boolean results for individual filter operations. All of these benefits accrue from the data engine ability to parse the data into records and fields as it transfers the data from the disk 23 to the JPU memory 27.

Figure 4:
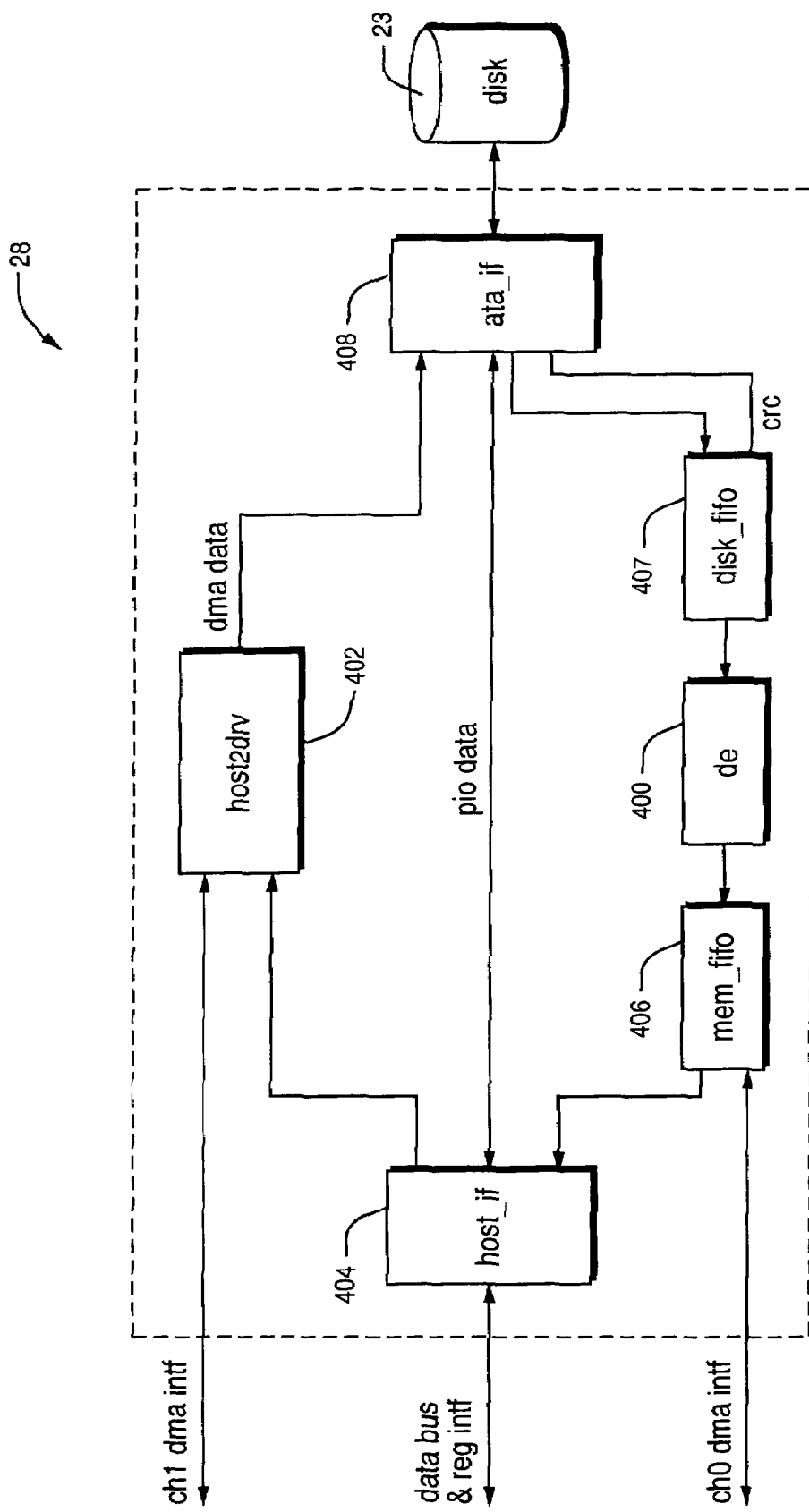
FIG. 4 is a block diagram of a Programmable Streaming Data Processor (PSDP) component.

As shown more particularly in FIG. 4, a PSDP 28 consists of a finite state machine and related logic called the Data Engine 400 which implements filter logic and tuple generation; a CPU interface 404; a disk interface (here the ATA interface 408); a (read) memory First-In-First-Out (FIFO)/driver 406, a (read) disk FIFO/driver 407; and a write DMA FIFO/driver 402. The Data Engine 400 is located between the disk FIFO/driver 407 and the memory FIFO/driver 406. The PSDP 28 supports both a Programmed I/O (PIO) Mode-2 for register access by the CPU 26 and a UDMA (Ultra-Direct Memory Access) mode-4 for streaming data transfers. The terms "flow through" and "filtered" are used to differentiate UDMA read modes. Both the flow-through and filtered modes use the disk and memory FIFO/drivers. This allows the disk 23, memory 27, and, if enabled, the filter logic 500 to process data at rates somewhat independent of each other. In flow-through mode, also referred to as "raw read" mode, data moves directly from the input to the output of the Data Engine 400 without being filtered. Data that is filtered has been processed, perhaps by culling records via a comparison and/or transaction ID processing (as described below), but always by reformatting the records into an output tuple, during which unselected fields can be dropped and PSDP-generated fields can be added. This process of culling records is called a "restrict" operation. The process of formatting fields into tuples is called a "project" (pronounced as in the operation of "throwing" something.)

Disk blocks read from the ATA interface 408 are first stored in a disk FIFO/driver 407. The Data Engine 400 reads its input data from the disk FIFO/driver 407. In flowthrough mode, the Data Engine 400 simply passes the raw data directly to the memory FIFO/driver 406. In filtering mode, as an initial operation, data read in from the disk FIFO/driver 407 is first analyzed to determine block header, record header, and record data fields. The Data Engine 400 then further processes these fields, to determine whether the correct disk data has been accessed, to form an output tuple, and conditionally to determine whether or not the tuple should be sent to the CPU. Tuples are formed in the memory FIFO/driver 406. For tuples that are to be sent, the Data Engine moves the visible pointer of the memory FIFO/driver 406 to the active pointer position as described above. From there, the memory DMA FIFO/driver 406 periodically transfers the memory FIFO/driver 406 contents into the memory 27 of the JPU 22.

There is thus of course also a DMA write mode, in which data from the JPU 22 flows through the DMA driver 402 directly to the ATA interface 408. For all three DMA modes (write, raw read, and filtered read), the PSDP 28 "shadows" the read/write disk command in order to control its own DMA state machines. It does not shadow the disk address or sector count, nor does it have access to the memory addresses. For writes and raw reads, the PSDP 28 blindly moves data from one interface to the other until the CPU 26 disables the mode. The CPU 26 knows the quantity of data to be moved for these modes and uses the disk and DMA controller 402 interrupts to identify the end of transfer.

For filtered reads, the quantity of data to be transferred to memory 27 is generally unknown, and the CPU 26 identifies the end of transfer from the disk and filter interrupts. All of the record information—header and data—can be projected during a filtered read, but the block header information can only be returned by a raw read. DMA data integrity is protected across the disk interface by an IDE CRC check.

Figure 5:
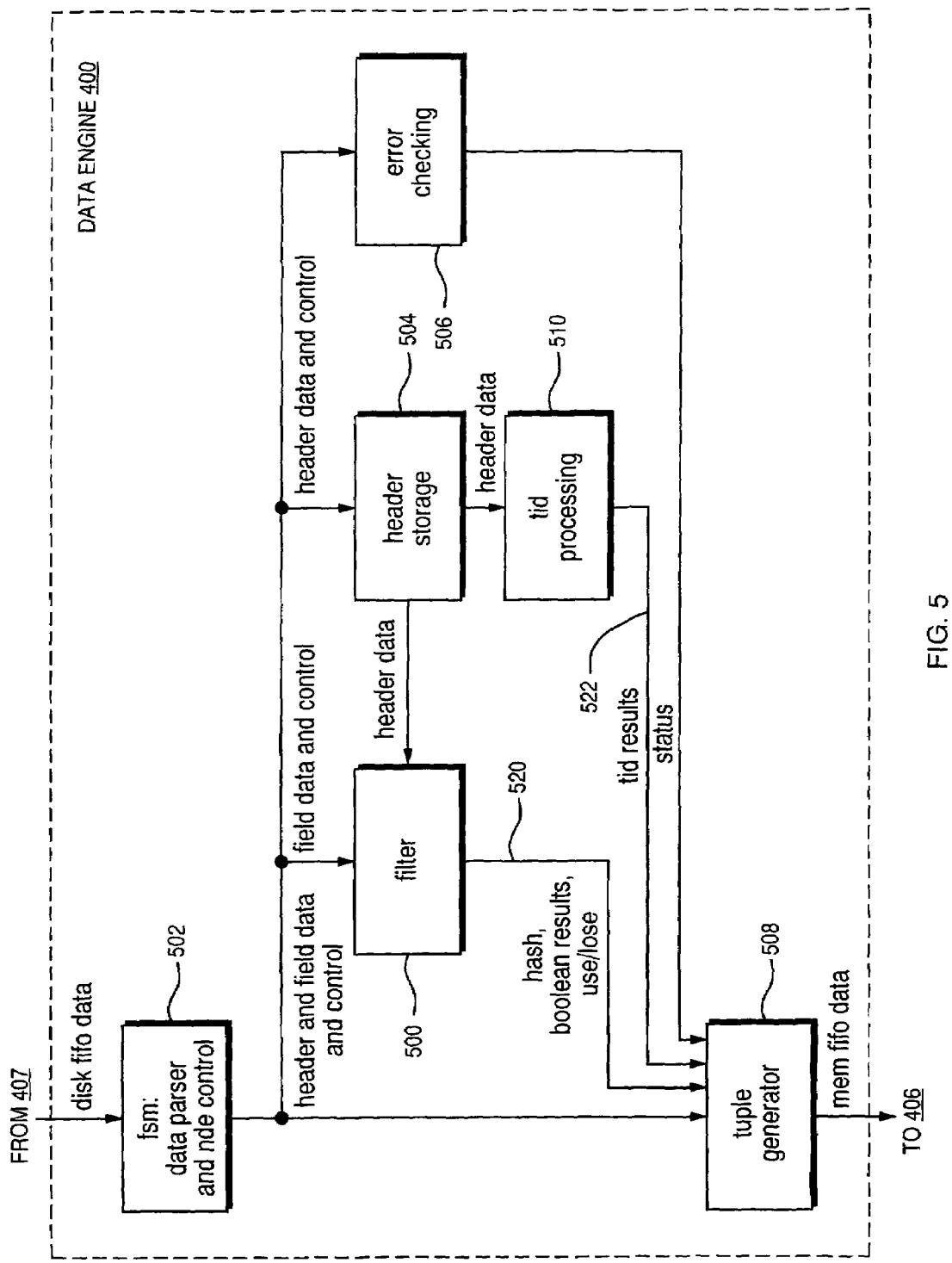
FIG. 5 is a more detailed view of portions of a PSDP.

The Data Engine 400 is shown in more detail in FIG. 5. It includes a data parser 502, filter logic 500, header storage 504, transaction ID processing 510, error checking 506, and output tuple generator 508. In general, the data parser 502 is responsible for taking non-field delineated streaming data from the disk FIFO/driver 407 and parsing it into block header, record header, and record data fields. This then permits the filter logic 500, header storage 504, transaction ID processing 510, and error checking 506 blocks to perform their respective tasks. In general, the tuple generator 508 takes output of the data parser 502, filter 500, and TID processing 510, and error checking 506 blocks and formats the results in a tuple, suitable for further processing by the CPU 26 or host 12.

Raw user table data or "records" as read from the disk 23, are understood and interpreted by the data parser 502. In one preferred embodiment at the present time, user table data is stored on disk in 128 KB segments called "blocks." Each block begins with an 8-word header, followed by 0 or more records. The format of the block header may be as follows:

| Block Header Field | Size | Details |
| --- | --- | --- |
| Magic number | 4B | identifies beginning of block, always "FEEDFACE" |
| CRC-32 | 4B | not used |
| Block number | 4B | within the table, 0 based, only 19 significant bits |
| Block address | 4B | starting sector number of the block |
| Block length | 4B | in bytes, including header, but not trailing 0's |
| Layout ID | 4B | like a version number on the data format |
| Table ID | 4B | the Postgres object ID that uniquely identifies the table |
| Sector count | 1B | defines block size, 0 means 256, as of this time, it's always 0 |
| Record count | 3B | number of records in the block, 0 means 0 |

The CRC-32 field is meant to be computed by software and written to the disk along with the rest of the block header. Its calculation was to include all data from the block number through the end of the last sector of the block, including any trailing 0's. Its primary purpose was to detect data corruption resulting from hardware or software bugs, but it could have detected disk data-retention problems as well. It is unrelated to the UDMA-mode CRC-16 calculation required by the ATA-5 specification, which only guards the physical interface between the PSDP 28 and disk-drive IO buffers.

The sector count is the number of sectors in the block, which must be from 1 to 256. Thus a 0 in this 1-byte field means 256. The sector count occupies the most-significant byte of the last word of the block header.

The record count is the number of records in the block, which may be 0.

A record, as read from the disk FIFO 406 into the Data Engine 400 is typically composed of a record header and one or more data fields, where the record header consists of three special fields, a length, and a null vector. The special fields are the row number, created transaction ID, and deleted transaction ID. All of the record header entries are optional on a per-table (not per-record) basis. However, if the record has a null vector, it must also have a record length, but not vice versa

| Record Header Field | Size | Detail |
| --- | --- | --- |
| Row number | 0 or 8B | existence per RowNumberSize register |
| Created XID | 0 or 8B | existence per CreatedXIDSize register |
| Deleted XID | 0 or 8B | existence per DeletedXIDSize register |
| Record length | 0 or 2B | size per RecordLengthSize register |
| Record NULL vector | 0 to 512B | size per FieldCount register |

The row number (sometimes called row_num) is the unique number of the row or record in the user's table. It is distinct from the row address (sometimes called row_addr), which is the complete physical address of a row in node-table-block-record format. The row number is also distinct from the record number, which is the 0-based ordinal number of a record within a block. The record number is the final component of the row address. The row address is computed by the PSDP.

The created XID contains the number, or ID, of the transaction that created the record.

The deleted XID. In a preferred embodiment, records are not actually deleted. Rather, they are marked as deleted so they can be restored if the transaction that performed the deleting is rolled back. (There are system management tools to reclaim the space.) A value of 0 indicates the record has not been deleted. A value of 1 indicates that the record was created by a transaction that was rolled back.

The record length is the length of the record in bytes, excluding the row number and the transaction IDs, but including the record length, the record null vector, the data fields, and any pad bytes at the end of the record needed for proper alignment of the first item of the following record. Thus, it is the distance in bytes from the beginning of the record length field to the beginning of the next record. Note that although all records in a table must have the same makeup, record lengths may vary because of variable-length character fields. The RecordLengthSize register defines record length sizes of 0, 1, 2, and 4 bytes, but in a preferred embodiment, only 0 and 2 are used.

The record null vector specifies which fields in the record are null, thereby indicating validity, not existence. For instance, a null varchar is not the same as an empty one. The record null vector must consist of an even number of bytes. The PSDP assumes that, if it exists, the record null vector has the same number of bits as the record has data fields, and computes the number of half-words in the null vector as (FieldCount+15)>>4. This vector is an array of bytes. Bit 0 of the byte immediately following the record length corresponds to the $0^{th}$ data field; bit 7 of that byte corresponds to the $7^{th}$ data field; bit 0 of the last byte of the word that contains the record length corresponds to the $8^{th}$ data field; and so on.

Strict rules governing field order and alignment are preferably observed. Both the record and its first data field must start on a word boundary (addr[1:0]=0). All record fields are self-aligned up to word boundaries. This means that 16, 12, 8, and 4 byte fields are word-aligned, 2-byte fields are ½-word-aligned (addr[0]=0), and 1-byte fields can start anywhere. The row number, created XID, and deleted XID are all 8 byte fields and do not require pad bytes to align them. If there is a record length but no record null vector, two pad bytes are required following the record length. If the record null vector exists, it immediately follows the record length and naturally starts on a two-byte boundary, but two pad bytes may be required following the record null vector to properly align the first data field.

The physical order of data fields, which often is not the same as the logical order, takes care of aligning non-character data fields; the physical order is N16, T12, N8, I8, F8, N4, 14, F4, D4, I2, D2, I1, C1, C2, . . . C16, V2. The fixed-length character fields are packed in as tightly as possible and are not aligned. Variable-length character fields start with a 2-byte length; they are ½-word-aligned and may require a preceding pad byte. Up to three pad bytes may follow the record's last data field in order to align the next record. If so, they are counted in the length of the earlier record.

More details of TID processing as performed by the TID processing block 510, includes rollback, are contained in co-pending U.S. patent application Ser. No. 10/646,522, filed in the United States Patent and Trademark Office on Aug. 22, 2003.

Figure 6:
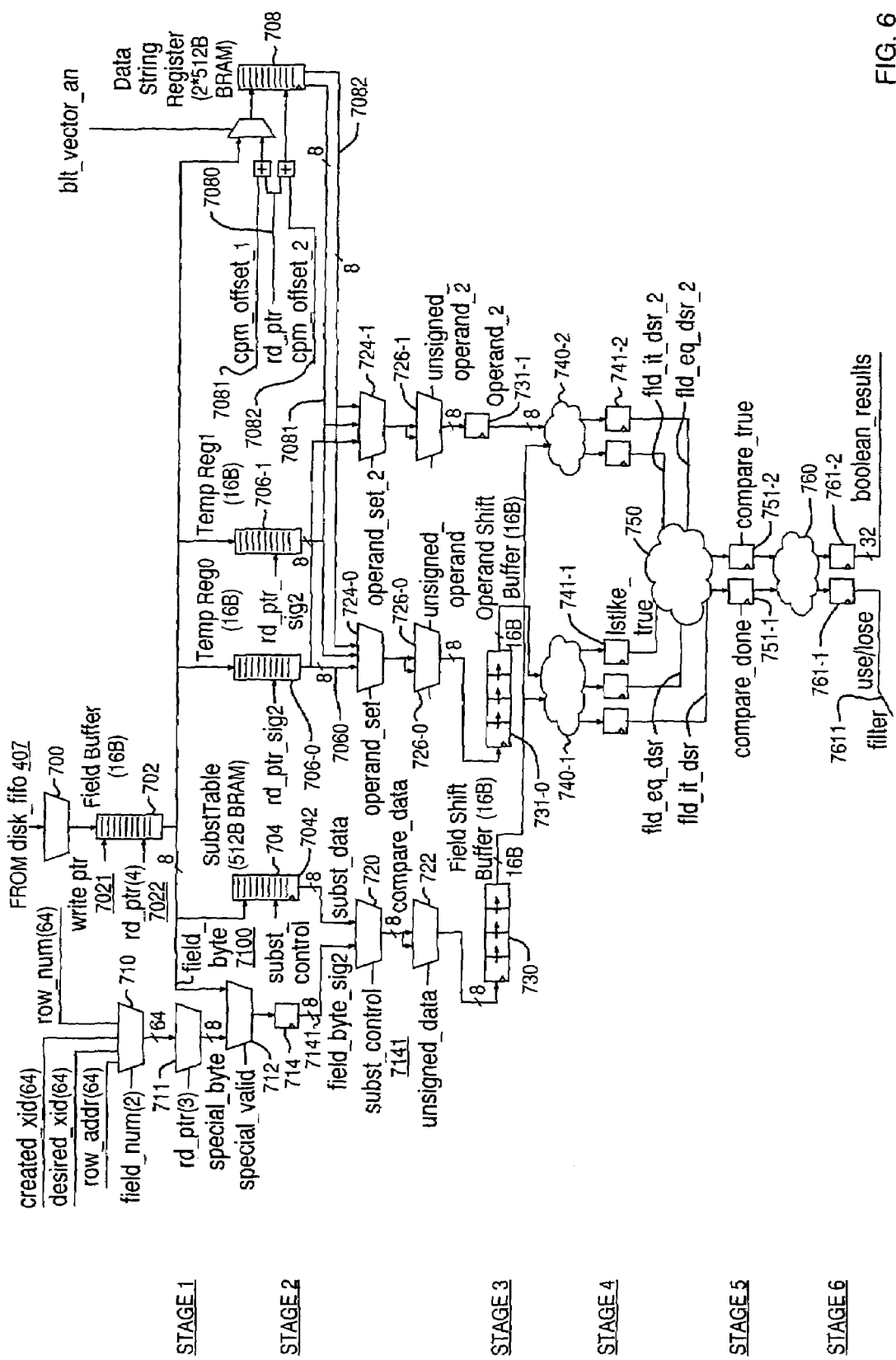
FIG. 6 is a detailed diagram of a filter element within the PSDP.

A detailed circuit diagram of the filter/comparison logic 500 is shown in FIG. 6. The filter logic 500 supports up to 32 comparison (and hash) instructions. Each operates on a single field, which can be a record header field, the row address, or a data field. Multiple instructions can operate on fields whose nominal length does not exceed 16-bytes (fixed-length fields and short varchars), but only one instruction can operate on longer variable-length fields (varchars and BLOBs). The instruction results are combined and can be presented in the tuple as the Boolean results output, the up-to 32 instructions taken together with the transaction ID processing results determine the use/lose decision.

Each instruction can perform up to two comparisons, using either a Data-String Register (DSR) 701 or temp registers 702 for the second operand(s); the two temp registers 702-0, 702-1 can, for example, be used to store one field in a record for comparison to a later received field in the same. The DSR can be used to store constants received from the CPU 26.

There is also a programmable, byte-wide substitution table 703 that can be used to simplify character field comparisons.

In the preferred embodiment, sixteen (16) different comparison function types are implemented by the primary comparison logic unit 720: e.g, true and false NOPs, the equality operators (=, !=, <, >=, >, <=), bit-vector join and its inverse, field is/is not null, field begins/does not begin with the operand, field contains/does not contain the operand. A preferred embodiment also contains a secondary comparison logic unit with just the NOPs and equality operators. An alternate embodiment might have all 16 operations in both comparison logic units. Although every comparison can be programmed for every supported data type (which may include integer, floating point, fixed- and variable-length character types etc.), not all combinations of data types and comparison operations are useful. The equality and null comparisons are appropriate for all types. For character comparisons, the string length and ASCII value of the characters determine inequality, such that "ABC" is less than "ABCD", and "A" is less than both "a" and "B". If a field is null, every comparison except null will fail. A bit-vector join operation and its inverse are for the integer data type. Begins, contains, and their inverses are for character types, both fixed- and variable-length.

A project function encompasses the selection of record fields, the generation of new fields, and the tuple formation and return. Tuples typically consist of a row number, some data fields, and a 2-byte length/status, but they can also include the created and/or deleted transaction IDs, the row address, up to 255 pad words, the 32 instructions results formed into the output Boolean results, the hash result, and a null vector.

A "use/lose" logic circuit 730 consists of up to eight sum or product terms which are then used to determine if a tuple is to be discarded. Each term can accept an input from each of the 32 instructions. The term outputs can be individually inverted before they are combined by either a sum-of-products (SOP) or product-of-sums (POS) calculation. Normally the filter indicates which records are to be kept, but the output of the SOP/POS calculation can be inverted to indicate which to reject. Taken altogether, the use/lose options provide deMorgan's Law term minimization.

While the record's data fields are parsed and optionally filtered, another circuit (e.g., the TID Processing block of FIG. 5) determines whether the record is valid by comparing the created and deleted transaction identifiers (TIDs) to a data structure called the Invisibility List, which may contain up to 32 entries. The first is always the ID of the current transaction, that is the transaction that created the current scan. The remainder define the transactions that are concurrent to the "current" transaction. There are five modes: off, normal, dirty, silent, and rollback. Normal and dirty set a status bit in the returned tuple, as described in the section below on tuple formats; silent and rollback affect the tuple's return, in conjunction with the filter results. More details of the use of transaction ID processing are contained in the aforementioned co-pending patent application. The hash is used to organize similar tuples into groups for processing joins or grouping selects. With the exception of the record null vector and length/status, all record-header and data fields can be used in calculating the hash. There are 7 defined hash modes, but the only one used is the full CRC, which calculates a 32-bit CRC hash starting with a seed of zero and using all of the bytes of all of the fields selected. Blank spaces in character fields are skipped, as are leading 0's in numerics and integers. At this time, leading 1's in negative numbers are included. Hash operations are defined on a per-field basis by the comparison instructions.

Within the PSDP 28, a "tuple" is used to describe the projected data as output by the tuple generator 508. The tuple generator 508 uses principally the filter 500 output but can also use TID processing 510 and error checking 506 outputs (FIG. 5). The term "tuple" is used here for the purpose of differentiating "raw" disk 23 and PSDP 28 output record formats. A tuple contains fields projected from the source record and up to six new fields: row address, pad words (tuple scratch pad), the boolean results from each of the filter operations, a hash result, the tuple null vector, and the tuple length. All are optional on a per-table (not per-record) basis. The order of these fields is given in the following table.

| Tuple Field | Size | Details |
| --- | --- | --- |
| Row number | 0/8B | from record header; upper two bytes are 0 |
| Created XID | 0/8B | from record header; upper two bytes are 0 |
| Deleted XID | 0/8B | from record header; upper two bytes are 0 |
| Row Address | 0/8B | node.table.block.record |
| Pad Words | 0-256W | Zeroed entries between specials and fields. |
| Data Fields | 0-nB | the data selected for return |
| Boolean Filter Result | 0/4B | 32 bit results of the (up to) 32 instructions. |
| Hash Result | 0/4B | computed by PSDP |
| Tuple Null vector | 0-512B | computed by PSDP; size known by software |
| Tuple length and Status | 0/1/2/4B | computed by PSDP; the tuple length in bytes; size per TupleLengthSize register. |

The row number, created XID, deleted XID, and data fields are the same as described above.

The row address is a compressed version of the node, table, block, and record information. RowAddress[63:32] is defined by the NodeIDTableID register, a 32-bit register that is programmed with a 32-bit, merged version of the node ID and the table ID as part of the filter setup. RowAddress[31:13] is the 19-bit block number defined by the block header. RowAddress[12:0] is the 13-bit record number calculated by the PSDP 28; it is 0-based within the current block.

Software may define up to 255 pad words in the tuple immediately following the special fields.

The Boolean filter result contains the pass/fail result for each of the 32 filter instructions.

The hash result is the output of the hash circuit.

The tuple null vector contains the record null vector bits for each data field software requested. Note that record and tuple null vectors do not generally match up. The tuple null vector must consist of an even number of bytes and begin on a two-byte boundary. Software must ignore any undefined bits as they may have been set by a previous scan. Once again, the existence of the null vector requires the existence of the length. Like the record null vector, the least-significant bit of byte 0 of the null vector refers to the $0^{th}$ field; the most-significant bit of byte 0 refers to the $7^{th}$ field; the least-significant bit of byte 1 refers to the 8$^{th}$ field, and so on, but the alignment and therefore the location of each of the bytes is different.

The tuple length is the total length of the tuple in bytes, including leading specials at the beginning of the tuple and any pad bytes at the end needed for proper alignment of the first item in the following tuple. Although all tuples returned by a scan must have the same makeup, tuples sizes may vary due to variable-length character fields. The TupleLengthSize register defines tuple length sizes of 0, 1, 2, and 4 bytes, but only 0 and 2 are used in a preferred embodiment. Because tuple fields are 4-byte aligned, tuple lengths are always multiples of four, and the least-significant two bits of the tuple length are available to indicate tuple status.

Bit 0 is the overrun bit. When set, it means the tuple was returned despite failing to meet the filter conditions. This can happen if the tuple is so large that the PSDP 28 must begin transferring it to JPU memory 27 before the use/lose decision can be made, as described above.

Bit 1 is the invalid bit. When set, it means the record from which this tuple was constructed has transaction IDs (TIDs) that make it invalid (i.e., it was invisibly created or it was visibly deleted).

With the exception of the length and nulls, tuple field alignments are the same as record field alignments. In the record, the length and nulls precede the data fields, and the record null vector is left-aligned against the preceding record length. In the tuple the length and nulls follow the data fields, and the tuple null vector is right-aligned against the tuple length, which ends the tuple. The size of the tuple null vector and the requirement that it end in byte lane 1 together determine the location of its first byte: byte lane 0 or 2 (see the examples below). Note the tuple null vector never occupies the same word as the last byte of data. Aligning the tuple length in this manner makes it possible for software to locate the length while striding through the tuples backwards in memory. Host software leaves enough space in memory at the head of the first tuple for a tuple length and null vector. This space allows relocating the length and null vectors ahead of the corresponding data fields as it walks the tuples backwards, then reverse direction to process the tuples forward. Alignment can require as many as five pad bytes between the last byte of data and the tuple null vector or length and, if neither null vector nor length exists, as many as three pad bytes following the last data byte.

Alignment examples for valid end of field data, tuple null vector, and tuple length:

In an alternate arrangement, the tuple can begin to be stored in the memory FIFO/driver 406 and if the use/lose bit 520 is asserted, the memory FIFO/driver contents active write pointer can be reset to its visible write pointer so that whatever has been stored for the current tuple will be ignored.

It can now be explained how the use/lose decision can be used to control which tuple sets are made visible in the memory FIFO/driver 406. Specifically, as shown in FIG. 5, the use/lose decision bit 520 is part of the output provided from the filter 500 that are fed to the tuple generator 508.

If a use/lose decision 520 indicates that the tuple is to be discarded, the tuple generator 508 then prevents the particular tuple from being forwarded from the memory FIFO/driver 406 to the memory of the JPU. This can be by either inhibiting a read on a data bus between them, or by resetting a pointer in the memory FIFO/driver 406.

If, however, the use/lose decision 520 indicates that the tuple did pass the comparison process, then the tuple generator 508 will present the tuple so that it can be send to the memory of the SPU.

In a preferred embodiment, the FIFO/drivers 406, 407, and 402 may be implemented as block random access memory (BRAMs). Specifically, they may be implemented using a two block RAM structure known in the prior art for constructing FIFO/drivers in Field Programmable Gate Arrays (FPGAs). In a specific preferred embodiment, the FIFO/drivers 406 and 407 are configured to provide 256 words, each 16 bytes wide.

The specific processor used for the CPU 26 in the JPU 22 may determine the specific preferred format and control structure of the FIFOs. For example, a certain processor may have Direct Memory Access (DMA) pattern that is fixed at the same size as a cache memory line, e.g., four bursts of four word each. In such a processing environment, the memory FIFO/driver 406 may thus need to store at least 16 words and preferably a multiple thereof, before forwarding it to the corresponding DMA interface 408. Such a processor may, for example, be the PowerPC processor available from Motorola, Inc. of Schaumburg, Ill.

However, other processors may not have fixed burst patterns operating more efficiently if a request is asserted for multiples of eight words. The DMA interface is configured accordingly for such processors.

Among the data bytes presented to the tuple generator 508 may be the transaction ID results 522 provided by the TID processing block 510. TID results 522 may further control the tuple generator 508 and, specifically, which data it produces

| Address | 0 | 1 | 2 | 3 | Address | 0 | 1 | 2 | 3 |
|---|---|---|---|---|---|---|---|---|---|
| | No Length or Nulls | | | | | No Length or Nulls | | | |
| I | data | data | data | data | i | data | data | data | data |
| i + 4 | data | data | data | data | i + 4 | data | data | data | data |
| i + 8 | data | data | data | data | i + 8 | data | pad | pad | pad |
| | Length but No Nulls | | | | | Length but No Nulls | | | |
| I | data | data | data | data | i | data | data | data | data |
| i + 4 | data | data | data | data | i + 4 | data | pad | pad | pad |
| i + 8 | pad | pad | length 1 | length 0 | i + 8 | pad | pad | length 1 | length 0 |
| | Length and 2-Byte Null | | | | | Length and 4-Byte Null | | | |
| I | data | data | data | data | i | data | pad | pad | pad |
| i + 4 | data | data | data | data | i + 4 | pad | pad | null 0 | null 1 |
| i + 8 | null 0 | null 1 | length 1 | length 0 | i + 8 | null 2 | null 3 | length 1 | length 0 | to be forwarded to the memory FIFO/driver 406. For example, the invalid bit asserted by TID processing 510 may also be used to control the output path from the memory FIFO/driver 406 to the memory of the JPU, or the invalid bit may be included as a status bit of the tuple.

If the tuple length is larger than the FIFO size, which can happen with varchar data, for example, the overrun and invalid bits are simply stored in the tuple, and the use/lose decision logic is inhibited to have no effect on the operation of the memory FIFO/driver 406. CPU 26 can still analyze the tuple status to determine that one of these bits is set, prior to actually processing the tuple. If the bits are set, it means that the tuple was returned despite failing to meet filter conditions.

When the data engine 400 sets an invalid bit or an overrun bit in any given tuple, it can also set a flag in a read register which can be used as a flag to summarize the status bits of all tuples in a related group. This read register can reflect the final PSDP status to identify whether any overflow or TID status bits were set in any of a group of tuples, further relieving the CPU from having to read the status bits of all tuples to determine if any have caused an overflow condition.

In this manner, it can thus be the case that bits within the tuple itself, for example, status bits which may be appended to the tuple length portion, can indicate whether a tuple is to be used or ignored by a CPU 26 of the JPU 22. This allows the CRU 26 to quickly discard a tuple that has marked as invalid.

Appendix A contains a Verilog description of the filter, and in particular the logic that controls the memory FIFO pointers and use/lose decision.

While this invention has been particularly shown and described with references to preferred embodiments thereof, it will be understood by those skilled in the art that various changes in form and details may be made therein without departing from the scope of the invention encompassed by the appended claims.

As shown more particularly in FIG. 6, the pipeline processor 500 (also referred to as a filter 500) is a clocked pipeline having six stages. In general, the filter 500 has elements on the left hand side of the drawing that are involved with selecting data from one or more portions of a record to be the processed "field(s)" as well as portions generally on the right hand side that are involved with selecting and/or generating "operands" against which the field data will be processed.

A first stage consists of a field buffer 702 responsible for storing the current field as it streams past and for being the principal input to decision logic in later stages. If more than one instruction operates on the same data field, the input FIFO is paused after the first instruction, and the subsequent instructions on the same field use the data already in the field buffer.

A second stage consists of a special field multiplexer 710, special byte multiplexer 711, and special valid multiplexer 712 followed by a field byte register 714. These are responsible for switching between field delineated streaming data sourced by the field buffer and special fields, including record header fields and a PSDP generated field. The second stage also consists of a number of registers including a substitution table 704, a pair of temporary registers 706-0 and 706-1 and a data string register 708.

Stage 3 includes a substitution control multiplexer 720 and compare data multiplexer 722. The operand select portion of Stage 2 includes a first operand select multiplexer 724-0 and second operand select multiplexer 724-1, each connected to receive a field from one of the temporary registers 706-0, 706-1, or the Data String Register (DSR) 708. Unsigned operand multiplexers 726-0 and 726-1 follow the operand select multiplexers 724-0 and 724-1, respectively. Stage 3 further includes a field shift buffer 730 responsible for implementing further delays as may be required for particular instructions on the data field and operand shift buffer 731-0 that performs a similar function for the select operand(s). In a preferred embodiment, an operand buffer 731-1 stores the second operand for equality and NOP comparisons.

Stages 4, 5, and 6 of a preferred embodiment implement instruction logic. Their specific implementation in terms of number of pipeline stages depends on of clock speed and available chip technology. These stages could be combined into one with either a slower clock speed or, preferably, faster silicon.

Stage 4 consists of a first operand logic circuit 740-1 and a second operand logic circuit 740-2. Each of the operand logic circuits 740 perform functions to carry out one of the comparison and bit vector join components of the up to 32 programmable instructions, as already described above. Registers 741-1 and 741-2 are used to further organize outputs from stage 4 before feeding them to stage 5.

At this point, comparison logic stage 750 is then used to compare results from the two logic operand stages 740. After delay by additional buffers 751-1 and 751-2, the results are fed to a Boolean result and use/lose logic 760 stage. Final registers 761-1 and 761-2 hold, respectively, the use/lose result and 32 bit Boolean result, the latter recording the result of each of the up to 32 instruction and consists of 1 bit per instruction.

In operation, data streaming in from the disk FIFO 706 is first fed to the input multiplexer 700. Disk FIFO 706 data is expected, in the preferred embodiment, to be 32 bits wide. However, processing within the pipeline 500 occurs on a byte wide basis; the multiplexer 700 thus converts each 32 bit wide word to four consecutive 8 bit wide bytes.

The byte oriented field data is then fed to field buffer 702. Field buffer 702 is preferably implemented in an FPGA construct known as Look Up Table (LUT) Random Access Memory (RAM), rather than block RAM or registers. The field buffer length of 16 bytes is chosen to correspond to the longest expected fixed field length in the data records being processed. While the expected maximum length here is 16 bytes, it should be understood that in other implementations, field buffer 702 may have a smaller or greater length.

The field buffer 702 is a simple FIFO structure that can wrap for variable length fields that, in the preferred embodiment, exceed 16 bytes. If it is possible for a field to exceed the size of the field buffer, software must not program more than one instruction for that field. The data parser 502 fills the field buffer 702; the pipeline processor empties it. Bytes from the field buffer 702 are then fed via the field byte bus 7100 to the substitution table 704, temporary registers 706-0 and 706-1, and data string register 708.

The substitution table 704 enables the filter 500 to perform field substitution as records are processed. For example, substitution table 704 may be a 512 byte block RAM which logically is arranged as two separately addressable substitution tables, each 256 bytes in length. The substitution table(s) can therefore be used to map any possible 8 bit input to any possible 8 bit output.

As one example, substitution table 704 may be used in a character data comparison that should ignore the upper and lower case attribute of characters. For example, if a string comparison is to be performed to locate all instances of the word "error" in a field of character text, a substitution table may be used to select instances of the word "Error" as well as instances of "error". To accomplish this, the substitution table 704 maps corresponding ASCII characters. Entries corresponding to capital letters in the ASCII table map to the ASCII code for the corresponding lower case letter, specifically. Thus, as shown in the drawing if a "E" is presently on the field byte bus and the substitution table is enabled as explained an "e" would be output by the substitution table.

The substitution control input 7040 is used to select which of the two tables, i.e., upper or lower, is to be activated. In a preferred embodiment, for example one of the substitution tables can be programmed for translation capital letters to lower case and the other one for translating lower case.

Bytes from the field buffer 702 then pass through the selector multiplexer 712 and delay 714. In normal processing the field byte would simply pass through the selector multiplexer 712 and is presented at the field byte stage 2 input to substitution control multiplexer 720 with the substitution data output being fed to the other input. In this manner, if a substitution is to be made, then assertion of the substitute control input 7200 on multiplexer 720 will cause selection of the substituted data output 7042 rather than original field byte 7141.

The unsigned data multiplexer 722 is used to remove an arithmetic sign on numeric data fields as maybe needed.

It can now be understood how the substitution table 704 can be used to assist with operations such as character comparisons, whereby upper and lower case distinctions between letters should be ignored. Similar implementations can be used to substitute character sets for language translation and the like.

Other multiplexers associate with fields may select the special row number, created transaction ID, deleted transaction ID, or row address fields. This then provides a path for a special byte input 7110 to be fed through the field multiplexer 720 if needed.

Turning attention briefly to the operand side of the filter 500 temporary registers 706-0 and 706-1 are each implemented as Look-Up Table (LUT) RAM, although they are used typically as simple registers. Again they will have a length corresponding to an expected maximum field length of 16 bytes. The temporary registers 706 provide a place for the temporarily store field valves from records. This is of particular advantage two or more fields in particular record. Thus, as records stream through the field buffer particular fields, may be temporarily stored, and aligned in time, prior to submission to the comparison logic 750 and 760.

As one example, consider an operation where a record contains three fields A, B, and C which appear in that order and where a particular instruction wishes to compare the value of field C to both field A and field B. As the fields are fed from the disk FIFO 706 in through the field buffer 700, field A will appear first on the field byte bus 7100. Field A will be stored, for example, in temporary register 706-0. As field 2 next appears on the field byte bus 7100, it will be stored in temporary register 706-1. Next, as field C appears on the field byte bus 7100 it will be fed through the field portion of the filter 500 to appear at the output of multiplexer 722, processed through the field shift buffer 730, and presented as a field input to logic stage 740-1. Temporary register output 706-0, asserted through the multiplexer 724-0 and 726-0, will appear as the operand to logic 740-1. In this manner, field A is compared to field C. Similarly, and at the same time, temporary register output 706-1, asserted through the multiplexer 724-1 and 726-1, will appear as the operand to logic 740-2. In this manner, field B is also compared to field C. The temporary registers therefore are capable of providing operands to one or both of the logic circuits 740-1 and 740-2.

The Data String Register (DSR) 708 provides a mechanism for the CPU 26 of the JPU 22 to provide data to be used as up to two operands. Specifically, the Data String Register (DSR) can be implemented as a pair of 512 byte BRAMS. A present instruction provides addresses into the DSR 708 as base read pointers 7080 as well as a stored operand length value. As the field buffer 702 steps through its contents with the read pointer 7022, that pointer is added to both base read pointers to create the address into the DSR 708. An instruction can therefore use these operands and assert inputs to the multiplexer 724-0 or 724-1 to cause the DSR contents to be used as operand(s). In this manner, for example, constants can be used to compare field values streaming in through the field buffer 702.

In a particularly interesting example, the DSR 708 can used offset values 7081 and 7082 and the read pointer 7080 to implement a field range compare in a single instruction cycle. It is common in database operations to perform a test against a field to determine if it lies between two values. For example, a range test may be performed to determine if a field, F, occurred between two dates, such that such that:

$$X<=F<=Y$$

where X and Y are constants. The present invention allows storing the constants X and Y in the DSR 708. An instruction is then constructed so that the less than or equal to operation will be performed in logic 740-1 and the greater than or equal to comparison is performed in logic 740-2. To accomplish this with the pipeline 500, the operand F is then fed from the field buffer 702 through the field byte stage 714 and field shift buffer 730 appear at the field inputs to both logic stages 740. Both constants are read from the data string register, with constant X on DSR bus 7081 and constant Y on DSR bus 7082. The operand set multiplexers 740-0, 740-1 are then asserted accordingly so that the constants flow through to the operand inputs of the respective logic circuits 740-1 and 740-2. Note that in this example the field shift buffer 730 and operand shift buffer 731-0 both act as single stage delays.

The DSR 708 can also be used as a type of bit join processor as well. For example, if a field is expected to have an expected to have only a fixed number of values, the DSR 708 can be used as fullers. Consider that an address field for a United States address may contain a field for the State, which can have only one of fifty values. Instead of storing the two character ASCII state abbreviation, the state address can be encoded into 1 of 50 values and stored on disk in a single byte. A bit vector join operation can be used to determine if a particular State is located in New England. In this example, the DSR can be loaded with a 64 bit value such that corresponding bits are asserted for the States of New England, (i.e., bit positions for Maine, New Hampshire, Vermont, Massachusetts, Rhode Island and Connecticut) with the other bits being cleared. The DSR output makes it way through muxes 724-0 and 726-0, the opterand shift buffer 731-0, to logic 740-1 which will further demux the 8 bits to select the single bit which is the result bit vector join results.

In the preferred embodiment, the CPU loads the DSR 708 from back to front, such that the last byte of the first operand appears in the last byte of the DSR 708. For example, if the first operand of the first instruction contains four bytes, it will be stored in the DSR beginning at the last address in the DSR (which in the preferred embodiment is 511) minus the operand length minus 1. For this example, the first byte of the first operand is located at address 508 and the operand fills addresses 508 to 511. The address '508' is then specified as part of the instruction to indicate the operand to be used.

The provides an advantage in programming bit vector joins. A bit vector operand may be very long, and there is more of an advantage in the PSDP perform in all of the comparison functions rather than a single bit vector join. Therefore the comparison operands are programmed into the DSR first, then the software on the CPU or host can use its write pointer into the DSR to determine whether there is sufficient remaining space for a bit vector join.

Stage 5 consists of logic 750 and registers 751-1 and 751-2. This logic selects combines the comparison and bit vector results as per CPU or host programming to calculate a single instruction result.

Stage 6 consists of logic 760 and registers 761-1 and 761-2. This logic combines the results of all instructions and the transaction ID processing to determine whether the tuple just formed in the output FIFO should be made visible or deleted. Stage 6 further stores the results from each of the individual instructions in the boolean result register 761-2, which is an input to the tuple generator 508. Discussion of how this is used in asserting output to the memory FIFO 407 is described above.

APPENDIX A

```
// ------------------------------------------------------------------------------
// ------------------------------------------------------------------------------
//
//              Copyright 2003 Netezza Corporation
//
// ------------------------------------------------------------------------------
// ------------------------------------------------------------------------------
// NDE (Netezza Data Engine) is the part of the FPGA that recognizes,
// filters and returns records. Sometimes called the Filter Unit.
module nde (clock,
[ STUFF DELETED ]
// Record Memory FIFO Overrun and Log both Overrun and Invalid Status
// ------------------------------------------------------------------------------
always@(posedge clock)
   begin
      if (status_reset)
         begin
            overrun              <= 0;
            overrun_summary      <= 0;
            invalid_summary      <= 0;
         end
      else
         begin
            // The last overrun term is to prevent a simultaneous overrun
            // (save_wr_ptr) and lose record (restore_wr_ptr).
            if (flow_thru || inc_current_record)
               overrun <= 0;
            else if (mem_fifo_full && mem_fifo_empty && mem_fifo_restore_wr_ptr)
               overrun <= 1;
            if (block_state==finish_record_2 && !use_record && overrun)
               overrun_summary <= 1;
            if (block_state==finish_record_2 && xid_done && !xid_valid &&
            tuple_sent)
               invalid_summary <= 1;
         end
   end
// Save and Restore the (visible, not actual) Memory FIFO Write Pointer
// ------------------------------------------------------------------------------
// Saving the memory FIFO write pointer makes the tuple most recently formed
// in that FIFO visible for DMA transfer to memory.
//
// Restoring the memory FIFO write pointer deletes the tuple most recently
// formed in that FIFO so it is never transferred to memory.
always@(flow_thru or block_state or mem_fifo_full or mem_fifo_empty or
mem_fifo_restore_wr_ptr)
   begin
      mem_fifo_save_wr_ptr =
         flow_thru   // In flow_thru mode, all words from disk are sent to memory
         || (block_state==check_record_count)        // use-lose has finished
         || (mem_fifo_full && mem_fifo_empty && !mem_fifo_restore_wr_ptr);
         // FIFO overrun
   end
always@(xid_mode or xid_done or xid_valid or overrun or instruction or
instruction_count or use_record)
   begin
      if (xid_mode==silent || xid_mode==rollback)
         mem_fifo_restore_wr_ptr = ((xid_done && !xid_valid && !overrun) ||
                                    (instruction > instruction_count) &&
                                    !use_record && !overrun));
      else
         mem_fifo_restore_wr_ptr = (instruction > instruction_count) &&
         !use_record && !overrun);
   end
// Use-Lose Decision
// -----------------------
   // Combine the eight sum or product terms with or, nor, and, or
   // nand depending on whether we're computing "lose the record"
```

APPENDIX A-continued

```
// rather than "use the record" and whether the filter condition is
// expressed in conjunctive rather than disjunctive normal form
// (i.e., product of sums rather than sum of products).
always@(sum_of_products or lose_not_use or first_level_terms)
    begin
        case ({sum_of_products,lose_not_use})
            2'b00: use_record = & first_level_terms;
            2'b01: use_record = ~(& first_level_terms);
            2'b10: use_record = | first_level_terms;
            2'b11: use_record = ~(| first_level_terms);
        endcase // case ({sum_of_products,lose_not_use})
    end
// Watch out for the SOP case where no first-level terms are used!
// In this case use_record = 0, which is opposite the no-terms-used
// result in the POS case, since an unused product term must be
// false and the sum of any number of falses is false, while an
// unused sum term must be true and the product of any number of
// trues is true. Software no doubt expects the default behavior
// to be true (i.e., use the record) in both cases. Software
// should either default to product of sums or always include a
// term with no comparisons enabled.
assign new_record = (block_state==record_length_parse);
first_level_term term_0 (reset, clock, new_record, sum_of_products,
                            compare_is_done, compare_is_true,
                            comparison_terms[0], use_terms[0],
                            invert_terms[0], first_level_terms[0]);
first_level_term term_1 (reset, clock, new_record, sum_of_products,
                            compare_is_done, compare_is_true,
                            comparison_terms[1], use_terms[1],
                            invert_terms[1], first_level_terms[1]);
first_level_term term_2 (reset, clock, new_record, sum_of_products,
                            compare_is_done, compare_is_true,
                            comparison_terms[2], use_terms[2],
                            invert_terms[2], first_level_terms[2]);
first_level_term term_3 (reset, clock, new_record, sum_of_products,
                            compare_is_done, compare_is_true,
                            comparison_terms[3], use_terms[3],
                            invert_terms[3], first_level_terms[3]);
first_level_term term_4 (reset, clock, new_record, sum_of_products,
                            compare_is_done, compare_is_true,
                            comparison_terms[4], use_terms[4],
                            invert_terms[4], first_level_terms[4]);
first_level_term term_5 (reset, clock, new_record, sum_of_products,
                            compare_is_done, compare_is_true,
                            comparison_terms[5], use_terms[5],
                            invert_terms[5], first_level_terms[5]);
first_level_term term_6 (reset, clock, new_record, sum_of_products,
                            compare_is_done, compare_is_true,
                            comparison_terms[6], use_terms[6],
invert_terms[6], first_level_terms[6]);
first_level_term term_7 (reset, clock, new_record, sum_of_products,
                            compare_is_done, compare_is_true,
                            comparison_terms[7], use_terms[7],
                            invert_terms[7], first_level_terms[7]);
endmodule // nde
// -----------------------------------------------------------------------------
// -----------------------------------------------------------------------------
// First-level term accumulator (one-bit slice)
// ------------------------------------------------
module first_level_term(reset,
                        clock,
                        start,
                        sum_of_products,
                        comparison_done,
                        comparison_true,
                        comparison_term,
                        use_term,
                        invert_term,
                        term);
// Port Declarations.
    input   reset, clock, start, sum_of_products,
            comparison_done, comparison_true, comparison_term,
            use_term, invert_term;
    output term;
/* Port descriptions:
reset and clock are the asynchronous reset and clock signals used by
 the NDE.
start means that we're starting to process a new record, so the
 boolean first-level terms accumulators have to be initialized.
```

APPENDIX A-continued

```
sum_of_products means the first-level terms are AND or NAND terms and
  the final term is OR or NOR.
comparison_done means the current instruction's comparison result is
  valid.
comparison_true is the current instruction's comparison result.
comparison_term means this term is supposed to be sensitive to the
  current instruction's comparison result.
use_term means this term will be used by the final term.
invert term means this term is to be inverted before being used by the
  final term (i.e. it's a NAND or NOR term, not an AND or OR term).
term is the first-level term.
*/
// Signal and State Element Declarations.
  reg   term;
// Kernel Code.
  // Create individual sum or product terms taking into account
  // whether the filter condition is expressed in conjunctive or
  // disjunctive normal form, whether we want to invert the term
  // before combining it with the other terms, and whether the term
  // is used at all. In other words, create eight 32-input terms
  // that can be and, nand, or, nor, true, or false (each term has
  // one input per instruction).
  // comparison_done means comparison_true is now valid.
  // use_comparison means comparison_true is now valid, and this
  // first-level term is supposed to be sensitive to this
  // instruction's comparison result.
  wire use_comparison = comparison_term & comparison_done;
  // remember to start by clearing or/nand terms and setting nor/and terms!
  always@(posedge clock)
    begin
      if (reset) term <= 0;
      else
        begin
          casex({sum_of_products,use_term,invert_term})
            3'b00?: term <= 1; // don't use; final reduction is and-nand
            3'b010: term <= ~start & term | ( use_comparison &
              comparison_true); // or
            3'b011: term <= start | term & (~use_comparison |
              ~comparison_true); // nor
            3'b10?: term <= 0; // don't use; final reduction is or-nor
            3'b110: term <= start | term & (~use_comparison |
              comparison_true); // and
            3'b111: term <= ~start & term | ( use_comparison &
              ~comparison_true); // nand
          endcase // case({sum_of_products,use_term,invert_term})
        end // else: !if(reset)
    end // always@ (posedge clock)
endmodule // first_level_term
```

What is claimed is:

1. A data engine, located in a programmable pipeline processor, for processing non-field delineated, streaming, application level database records received from a mass storage device, the data engine comprising:

a data parser configured to recognize the record and field structure of the non-field delineated database records, determine field boundaries in the non-field delineated database records, parse the non-field delineated database records into field delineated data, and process fields to select one or more fields to be assembled into output tuples;

filter logic configured to receive the field delineated data from the data parser, and to filter the field delineated data by performing a field operation on the field delineated data; and an output tuple generator configured to assemble filtered field delineated data into an output tuple.

2. The data engine of claim 1 wherein the filter logic further comprises a programmable memory that serves as a substitution table for field delineated database records, and wherein performing a field operation on the field delineated database records includes performing a field comparison on selected fields of the field delineated data.

3. The data engine of claim 2 wherein the substitution table includes a data-string register.

4. The data engine of claim 2 wherein the substitution table includes a temporary register.

5. The data engine of claim 2 wherein the field comparison is a character field comparison.

6. The data engine of claim 1 wherein the output tuple assembled by the output tuple generator contains only selected data fields of the field delineated data.

7. The data engine of claim 1 wherein the filter logic is further configured to filter the field delineated data by flagging data for further processing.

8. The data engine of claim 1 further comprising header storage configured to receive header and control data of the field delineated data from the data parser and provide header data to the filter logic, wherein the filter logic is further configured to use header data to filter field delineated data.

9. The data engine of claim 1 further comprising an ID processing module configured to receive header and control data of the field delineated data, to identify the validity of field delineated data by processing an ID field in the header data, and to provide the identified validity to the tuple generator.

10. The data engine of claim 9 wherein the ID field stores a transaction ID associated with the field delineated data.

11. A method for processing, in a programmable pipeline processor, non-field delineated, streaming, application level database records received from a mass storage device, the method comprising:
  receiving the non-field delineated database records in a field buffer as an input data stream;
  recognizing the record and field structure of the non-field delineated database records in the field buffer;
  determining field boundaries in the non-field delineated database records by separating the input data stream into field delineated data in the field buffer under instruction from an external central processing unit;
  processing fields to select one or more fields to be assembled into output tuples;
  filtering the field delineated data by sending field delineated data from the field buffer to at least one logic unit that performs at least one field operation on the field delineated data; and
  assembling the filtered field delineated data into an output tuple.

12. The method of claim 11 wherein filtering further comprises:
  providing a substitution table for field delineated data; and
  performing a field comparison on selected fields of the field delineated data.

13. The method of claim 12 wherein the substitution table includes a data-string register.

14. The method of claim 12 wherein the substitution table includes a temporary register.

15. The method of claim 12 wherein the field comparison is a character field comparison.

16. The method of claim 11 wherein the output tuple contains only selected data fields of the field delineated data.

17. The method of claim 11 wherein filtering the field delineated data comprises flagging data for further processing.

18. The method of claim 11 further comprising using header storage data of the field delineated data to separate field delineated data.

19. The method of claim 11 further comprising:
  identifying the validity of field delineated data by processing an ID field in header data of the field delineated data; and
  assembling the filtered data into the output tuple based on the validity of the field delineated data.

20. The method of claim 19 wherein the ID field stores a transaction ID associated with the field delineated data.

* * * * *

UNITED STATES PATENT AND TRADEMARK OFFICE
CERTIFICATE OF CORRECTION

| | | |
|---|---|---|
| PATENT NO. | : 7,698,338 B2 | Page 1 of 1 |
| APPLICATION NO. | : 10/665726 | |
| DATED | : April 13, 2010 | |
| INVENTOR(S) | : Hinshaw et al. | |

It is certified that error appears in the above-identified patent and that said Letters Patent is hereby corrected as shown below:

In the Drawings

Sheet 1, Fig. 1, the label "7P" for block 26 should be replaced with -- CPU --.

Sheet 1, Fig, 1, the label "PDRF" for block 28 should be replaced with -- PSDP --.

Sheet 3, Fig. 3, reference numeral "20" should be replaced with -- 22 --.

Sheet 6, Fig. 6, reference numeral "7021" should be replaced with -- 702(1) --.

Sheet 6, Fig. 6, reference numeral "7022" should be replaced with -- 702(2) --.

In the Specification

Column 12, lines 35-36, replace "memory DMA FIFO/driver" with -- memory FIFO/driver --.

Column 12, line 39, replace "DMA driver 402" with -- DMA FIFO/driver 402 --.

Column 12, line 48, replace "DMA controller 402" with -- DMA FIFO/driver 402 --.

Column 13, line 43, replace "disk FIFO 406" with -- disk FIFO/driver 407 --.

Column 18, line 37, replace "DMA interface 408" with -- ATA interface 408 --.

Column 19, line 26, replace "CRU 26" with -- CPU 26 --.

Signed and Sealed this
Third Day of June, 2014

Michelle K. Lee
*Deputy Director of the United States Patent and Trademark Office*